(12) United States Patent
Shrestha et al.

(10) Patent No.: US 11,539,426 B2
(45) Date of Patent: Dec. 27, 2022

(54) RANDOM ACCESS PROCEDURES FOR NON-TERRESTRIAL NETWORKS

(71) Applicant: QUALCOMM Incorporated, San Diego, CA (US)

(72) Inventors: Bharat Shrestha, San Diego, CA (US); Liangping Ma, San Diego, CA (US); Umesh Phuyal, San Diego, CA (US); Xiao Feng Wang, San Diego, CA (US); Alberto Rico Alvarino, San Diego, CA (US); Ayan Sengupta, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 44 days.

(21) Appl. No.: 17/149,710

(22) Filed: Jan. 14, 2021

(65) Prior Publication Data
US 2022/0224407 A1 Jul. 14, 2022

(51) Int. Cl.
*H04B 7/185* (2006.01)
*H04L 1/18* (2006.01)
(Continued)

(52) U.S. Cl.
CPC ..... *H04B 7/18539* (2013.01); *H04B 7/18589* (2013.01); *H04L 1/1819* (2013.01);
(Continued)

(58) Field of Classification Search
None
See application file for complete search history.

(56) References Cited

U.S. PATENT DOCUMENTS

| 10,554,293 | B1 * | 2/2020 | Chin | H04B 7/18528 |
| 2020/0322981 | A1 * | 10/2020 | Choe | H04W 72/0446 |
| 2020/0396744 | A1 * | 12/2020 | Xiong | H04W 72/0446 |

(Continued)

FOREIGN PATENT DOCUMENTS

WO WO-2020198671 A1 10/2020

OTHER PUBLICATIONS

3GPP TR 38.821: "3rd Generation Partnership Project, Technical Specification Group Radio Access Network, Solutions for NR to Support Non-Terrestrial Networks (NTN) (Release16)", 3GPP Standard, Technical Report, 3rd Generation Partnership Project (3GPP), Mobile Competence Centre, 650, Route Des Lucioles, F-06921 Sophia-Antipolis Cedex, France, vol. RAN WG3, No. V16.0.0 (Dec. 2019), Jan. 16, 2020 (Jan. 16, 2020), XP051860814, pp. 1-140, Retrieved from the Internet: URL: http://ftp.3gpp.org/Specs/archive/38_series/38.821/38821-g00.zip 38821-g00.doc [Retrieved on Jan. 16, 2020] Paragraphs [04.1], [6.3.4], [07.3], [09.2], Para. 7.3. 1.1-7.3. 1.2, 7.3.1.3.2, Para.8.1-8.2.2.2, p. 63, Paragraph 6.2.4 p. 82, Paragraph 7.2.1.2.1-p. 83, Paragraph 7.2.1.2.1, p. 89, Paragraph 7.3-p. 93, Paragraph 7.3.1.7, Section 1, Section 5, Section: 7.2.1.1, p. 38, Option 2, Section 6.2.3, Section 6.2.4, abstract sections 7.3.1 and 7.3.2.

(Continued)

*Primary Examiner* — Saad Khawar
(74) *Attorney, Agent, or Firm* — Holland & Hart LLP

(57) ABSTRACT

Methods, systems, and devices for wireless communication are described. A communication device, such as a user equipment (UE) may transmit, to a base station of a non-terrestrial network, a random access request message associated with a random access procedure using a transport block size (TBS) and a power control specified for the random access request message (e.g., a payload of the random access request message) for the random access procedure. The random access request message including a (Continued)

random access preamble and a random access payload carrying a buffer status report (BSR) or uplink data, or both. The UE may then monitor a response window based at least in part on transmitting the random access request message. The UE may receive, from the base station of the non-terrestrial network, a response message of the random access procedure during the response window.

30 Claims, 13 Drawing Sheets

(51) Int. Cl.
*H04L 5/00* (2006.01)
*H04W 24/08* (2009.01)
*H04W 28/02* (2009.01)
*H04W 74/08* (2009.01)

(52) U.S. Cl.
CPC ........... *H04L 5/0055* (2013.01); *H04W 24/08* (2013.01); *H04W 28/0278* (2013.01); *H04W 74/0833* (2013.01)

(56) References Cited

U.S. PATENT DOCUMENTS

| | | | |
|---|---|---|---|
| 2020/0413451 A1 | 12/2020 | Taherzadeh Boroujeni et al. | |
| 2021/0051736 A1* | 2/2021 | Jeon | H04W 76/18 |
| 2021/0144742 A1* | 5/2021 | Jeon | H04W 74/0833 |
| 2021/0219349 A1* | 7/2021 | Huang | H04W 74/0833 |

OTHER PUBLICATIONS

3GPP TS 38.321: "3rd Generation Partnership Project, Technical Specification Group Radio Access Network, NR, Medium Access Control (MAC) Protocol Specification (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG2, No. V16.3.0 (Dec. 2020), Jan. 6, 2021 (Jan. 6, 2021), pp. 1-156, XP051999701, Retrieved from the Internet: URL: https://ftp.3gpp.org/Specs/archive/38_series/38.321/38321-g30.zip 38321-g30.docx [retrieved on Jan. 6, 2021] section 1, section 5.1.
Ericsson: "On Random Access in Ntn", 3GPP TSG-RAN WG2 #112, 3GPP Draft, R2-2010980 (Revision of R2-2010169), 3rd Generation Partnership Project (3GPP), Mobile Competence Centre, 650, Route Des Lucioles, F-06921 Sophia-Antipolis Cedex, France, vol. RAN WG2, No. E-Meeting, Nov. 2, 2020-Nov. 13, 2020, Oct. 29, 2020 (Oct. 29, 2020), XP051948402, Retrieved from the Internet: URL: https://ftp.3gpp.org/tsg_ran/WG2_RL2/TSGR2_112-e/Docs/R2-2010980.zip R2-2010980—On Random Access in NTN.docx [retrieved on Oct. 29, 2020] the whole document.
International Search Report and Written Opinion—PCT/US2021/072783—ISA/EPO—dated Mar. 25, 2022 (2101849WO).
Nokia, et al., "Discussion on 2-Step RACH Adaptation in NTN", 3GPP TSG-RAN WG2 Meeting #112 Electronic, 3GPP Draft, R2-2009981, 3rd Generation Partnership Project (3GPP), Mobile Competence Centre, 650, Route Des Lucioles, F-06921 Sophia-Antipolis Cedex, France, vol. RAN WG2, No. Electronic, Elbonia, Nov. 2, 2020-Nov. 13, 2020, 4 Pages, Oct. 23, 2020 (Oct. 23, 2020), XP051942734, Retrieved from the Internet: URL: https://ftp.3gpp.org/tsg_ran/WG2_RL2/TSGR2_112-e/Docs/R2-2009981 .zip R2-2009981 Discussion on 2-step RACH adaptation in NTN.docx [retrieved on Oct. 23, 2020] the whole document.

\* cited by examiner

RANDOM ACCESS PROCEDURES FOR NON-TERRESTRIAL NETWORKS

FIELD OF TECHNOLOGY

The following relates to wireless communication, including random access procedures for non-terrestrial networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may be a terrestrial network or a non-terrestrial network, or a combination thereof. These wireless communications systems may support one or more random access procedures (e.g., a random access channel (RACH) procedure) for establishing a connection between a UE and a base station. Examples of random access procedures may include a two-step RACH procedure and a four-step RACH procedure. As demand for communication efficiency increases, some wireless communications systems, such as non-terrestrial networks, may be unable to support high reliability or low latency random access messaging, among other examples.

SUMMARY

Various aspects of the described techniques relate to configuring a communication device, which may be a UE, to handle a random access procedure in a non-terrestrial network. The UE may be configured, for example, to use a specified transport block size (TBS) for a random access request message (e.g., a message A (msgA) of a two-step RACH procedure) carrying control information (e.g., a buffer status report (BSR)) with or without uplink data, as described herein. In some examples, the UE may be further configured with a power configuration indicating a specified power ramping value to use when performing the random access procedure in the non-terrestrial network. Additionally or alternatively, the UE may be configured with a timing configuration for updating or ignoring a timing advance when performing the random access procedure in the non-terrestrial network. In some other examples, the UE may be further configured to adjust a response window to monitor for a response message (also referred to as a random access response message) (e.g., a message B (msgB) of a two-step RACH procedure) when performing the random access procedure in the non-terrestrial network. The described techniques may provide improvements to power consumption and, in some examples, may promote higher reliability and lower latency random access operations in a non-terrestrial network, among other benefits. The UE may thus be configured to support improvements for random access procedures (e.g., a two-step RACH procedure, a four-step RACH procedure) in a non-terrestrial network.

A method for wireless communication at a UE is described. The method may include transmitting, to a base station of a non-terrestrial network, a random access request message associated with a random access procedure using a TBS and a power control specified for the random access request message for the random access procedure, the random access request message including a random access preamble and a random access payload carrying a BSR or uplink data, or both, monitoring a response window based on transmitting the random access request message, and receiving, from the base station of the non-terrestrial network, a response message of the random access procedure during the response window.

An apparatus for wireless communication at a UE is described. The apparatus may include a processor, memory coupled with the processor, and instructions stored in the memory and operable, when executed by the processor, to cause the apparatus to transmit, to a base station of a non-terrestrial network, a random access request message associated with a random access procedure using a TBS and a power control specified for the random access request message for the random access procedure, the random access request message including a random access preamble and a random access payload carrying a BSR or uplink data, or both, monitor a response window based on transmitting the random access request message, and receive, from the base station of the non-terrestrial network, a response message of the random access procedure during the response window.

Another apparatus for wireless communication at a UE is described. The apparatus may include means for transmitting, to a base station of a non-terrestrial network, a random access request message associated with a random access procedure using a TBS and a power control specified for the random access request message for the random access procedure, the random access request message including a random access preamble and a random access payload carrying a BSR or uplink data, or both, means for monitoring a response window based on transmitting the random access request message, and means for receiving, from the base station of the non-terrestrial network, a response message of the random access procedure during the response window.

A non-transitory computer-readable medium storing code for wireless communication at a UE is described. The code may include instructions executable by a processor to transmit, to a base station of a non-terrestrial network, a random access request message associated with a random access procedure using a TBS and a power control specified for the random access request message for the random access procedure, the random access request message including a random access preamble and a random access payload carrying a BSR or uplink data, or both, monitor a response window based on transmitting the random access request message, and receive, from the base station of the non-terrestrial network, a response message of the random access procedure during the response window.

Some examples of the method, apparatuses, and non-transitory computer-readable medium described herein may further include operations, features, means, or instructions for receiving, in a message, a configuration including an indication of the TBS specified for the random access procedure, the message including a radio resource control (RRC) message, a medium access control-control element (MAC-CE) message, or a downlink control information (DCI) message, where the transmitting of the random access request message includes and transmitting the random access payload on a physical uplink shared channel (PUSCH) based on the TBS specified for the random access payload carried in the random access request message for the random access procedure.

Some examples of the method, apparatuses, and non-transitory computer-readable medium described herein may further include operations, features, means, or instructions for determining a set of TBSs based on a configuration, where the set of TBSs includes, a first subset of TBSs to use for the random access payload based on the random access payload carrying the BSR without the uplink data, and a second subset of TBSs to use for the random access payload based on the random access payload carrying the uplink data without the BSR.

Some examples of the method, apparatuses, and non-transitory computer-readable medium described herein may further include operations, features, means, or instructions for selecting the TBS from the set of TBSs based on the random access payload carrying the BSR without the uplink data or the random access payload carrying the BSR with the uplink data, where the transmitting of the random access request message includes and transmitting the random access payload on a PUSCH based on the selecting of the TBS.

In some examples of the method, apparatuses, and non-transitory computer-readable medium described herein, the selecting of the TBS from the set of TBSs for the random access payload carrying the BSR without the uplink data may be based on the uplink data satisfying a TBS threshold.

In some examples of the method, apparatuses, and non-transitory computer-readable medium described herein, the selecting of the TBS from the set of TBSs for the random access payload carrying the BSR without the uplink data may be based on a PUSCH resource configured for the random access procedure failing to satisfy a logical channel prioritization (LCP) associated with a logical channel for the uplink data.

In some examples of the method, apparatuses, and non-transitory computer-readable medium described herein, the first subset of TBSs may be configured for a first PUSCH occasion associated with the random access procedure and the second subset of TBSs may be configured for a second PUSCH occasion associated with the random access procedure, the first PUSCH occasion may be different than the second PUSCH occasion.

Some examples of the method, apparatuses, and non-transitory computer-readable medium described herein may further include operations, features, means, or instructions for determining the TBS for the random access payload carrying the BSR based on a preamble associated with the random access request message, where the transmitting of the random access request message includes and transmitting the random access payload on a PUSCH, based on the determining of the TBS for the random access payload, during a first PUSCH occasion associated the random access procedure or a second PUSCH occasion associated the random access procedure, or both.

Some examples of the method, apparatuses, and non-transitory computer-readable medium described herein may further include operations, features, means, or instructions for determining the TBS for the random access payload carrying the BSR based on a partitioning of a set of PRACH resources or a grouping of a set of random access preambles including the random access preamble associated with the random access procedure, where the transmitting of the random access request message includes and transmitting the random access payload on a PUSCH, based on the determining of the TBS for the random access payload, during a first PUSCH occasion associated the random access procedure or a second PUSCH occasion associated the random access procedure, or both.

Some examples of the method, apparatuses, and non-transitory computer-readable medium described herein may further include operations, features, means, or instructions for receiving, in a message, a configuration including an indication of a power ramping parameter specified to use for the non-terrestrial network and where the transmitting of the random access request message associated with the random access procedure may be based on the power ramping parameter specified for the non-terrestrial network.

Some examples of the method, apparatuses, and non-transitory computer-readable medium described herein may further include operations, features, means, or instructions for adjusting a transmit power level based on the power ramping parameter and a reference signal configuration including a synchronization signal block (SSB) or a channel state information reference signal (CSI-RS), where the transmitting of the random access request message includes and transmitting the random access preamble on a physical random access channel (PRACH) or the random access payload on a PUSCH, or both, based on the adjusting of the transmit power level.

Some examples of the method, apparatuses, and non-transitory computer-readable medium described herein may further include operations, features, means, or instructions for adjusting a transmit power level based on the power ramping parameter, a reference signal configuration, or a serving cell configuration, or a combination thereof, where the reference signal configuration may be different for the random access preamble and a previous random access preamble transmission, and the serving cell configuration may be the same for the random access preamble and the previous random access preamble transmission, where the transmitting of the random access request message includes and transmitting the random access preamble on a PRACH or the random access payload on a PUSCH, or both, based on the adjusting of the transmit power level.

Some examples of the method, apparatuses, and non-transitory computer-readable medium described herein may further include operations, features, means, or instructions for receiving, from the base station of the non-terrestrial network, a timing advance command in the response message of the random access procedure and restarting a timing advance timer regardless of a status of the timing advance timer based on the receiving of the timing advance command in the response message of the random access procedure.

Some examples of the method, apparatuses, and non-transitory computer-readable medium described herein may further include operations, features, means, or instructions for configuring whether the UE determines the status of the timing advance timer after receiving the timing advance command, where restarting the timing advance timer may be based on the configuring.

In some examples of the method, apparatuses, and non-transitory computer-readable medium described herein, the TBS and the power control may be specified for the random access payload of the random access request message for the random access procedure.

Some examples of the method, apparatuses, and non-transitory computer-readable medium described herein may further include operations, features, means, or instructions for transmitting feedback information associated with the random access response message and where the response message may be received on a physical downlink shared channel (PDSCH) addressed to a cell-radio network temporary identifier (C-RNTI), and the feedback information includes a hybrid automatic repeat request acknowledgement (HARQ-ACK) or a hybrid automatic repeat request non-acknowledgement (HARQ-NACK).

Some examples of the method, apparatuses, and non-transitory computer-readable medium described herein may further include operations, features, means, or instructions for adjusting a duration of the response window based on an offset value and the feedback information including the HARQ-NACK, monitoring the response window based on the adjusting of the duration of the response window, and receiving a retransmission of the response message of the random access procedure during the response window.

Some examples of the method, apparatuses, and non-transitory computer-readable medium described herein may further include operations, features, means, or instructions for receiving, in a message, a configuration including an indication of a value of a set of values for the duration of the response window, where each value of the set of values for the duration of the response window correspond to a respective round-trip delay (RTD) value associated with a communication link of the non-terrestrial network and where the adjusting of the duration of the response window may be based on the configuration.

Some examples of the method, apparatuses, and non-transitory computer-readable medium described herein may further include operations, features, means, or instructions for restarting the response window based on the feedback information including the HARQ-NACK.

Some examples of the method, apparatuses, and non-transitory computer-readable medium described herein may further include operations, features, means, or instructions for enabling an offset timer to monitor for a retransmission of the response message based on the transmitting of the feedback information or the response window expiring, or both.

Some examples of the method, apparatuses, and non-transitory computer-readable medium described herein may further include operations, features, means, or instructions for determining that the random access procedure may be successful based on the receiving of the response message and monitoring a physical downlink control channel (PDCCH) associated with a C-RNTI based on the determining that the random access procedure may be successful.

DETAILED DESCRIPTION

Figure 1:
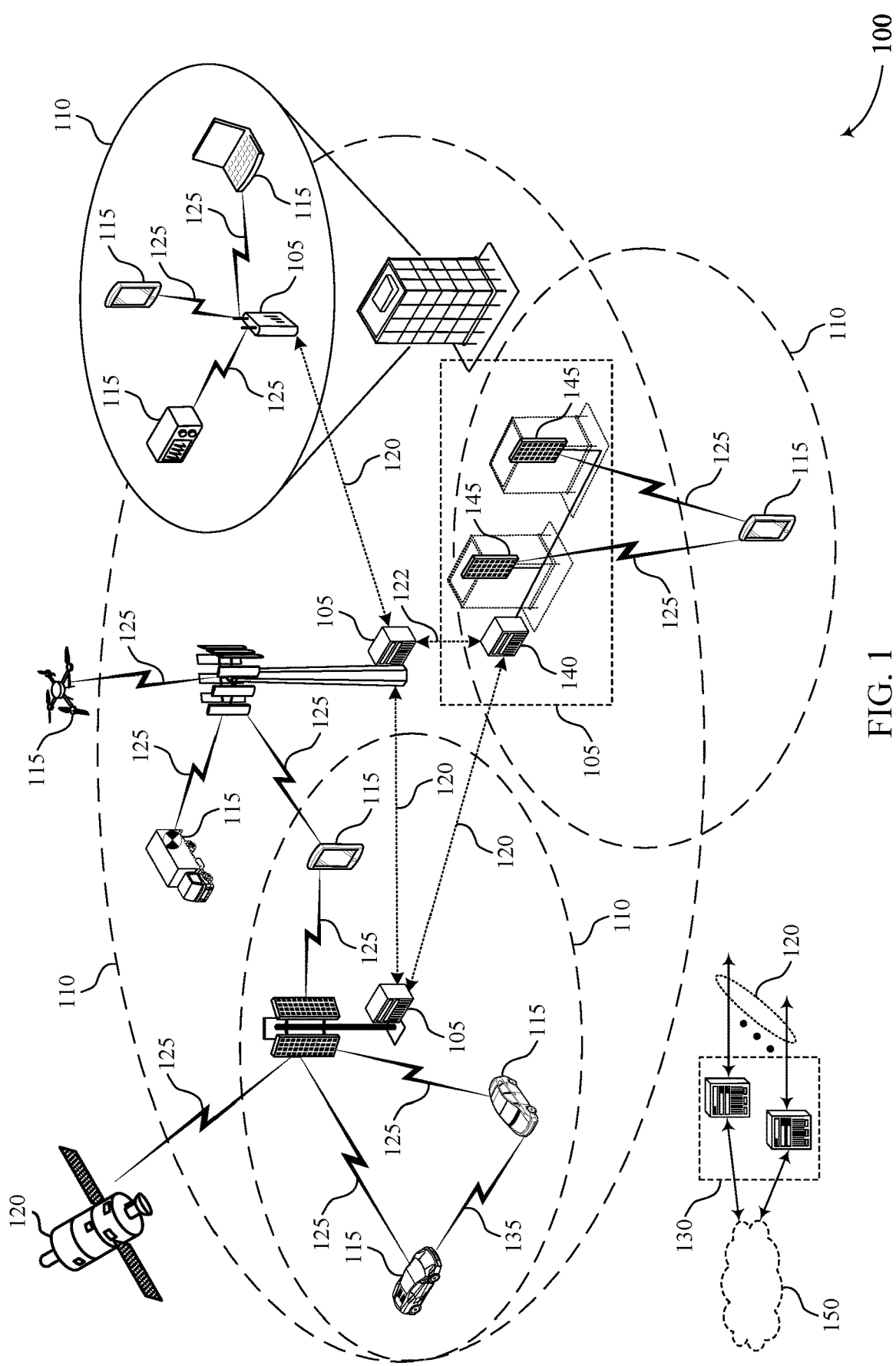
FIGS. 1 and 2 illustrate examples of wireless communications systems that support random access procedures for non-terrestrial networks in accordance with aspects of the present disclosure.

A wireless communications system may include various communication devices such as a UE and a base station, which may provide wireless communication services to the UE. The wireless communications system, in some examples, may be a terrestrial network, which may support multiple radio access technologies including 4G systems, such as 4G LTE, as well as 5G systems, which may be referred to as 5G NR. Additionally or alternatively, the wireless communications system may be a non-terrestrial network, for example, a low-earth orbit (LEO) wireless communications system, a geosynchronous equatorial orbit (GEO) wireless communications system, among other examples. In the wireless communications systems, the communications devices (e.g., a UE, a base station) may support one or more multiple random access procedures, such as a two-step RACH procedure or a four-step RACH procedure. These random access procedures may also be contention-based or contention-free as described herein.

The wireless communication system may be a terrestrial network or a non-terrestrial network, or a combination thereof. A non-terrestrial network may provide coverage by using high-altitude devices (e.g., satellites) between a UE and a base station (also referred to as access stations, access gateways, non-terrestrial base stations). In some examples, the base station may consist of a control unit (CU) (e.g., gNB-CU) and a distributed unit (DU) (e.g., a gNB-DU). The gNB-CU may be non-terrestrial, while the gNB-DU may be terrestrial (e.g., located on the ground). As such, there may be latency between the gNB-DU and the gNB-CU. In the wireless communications system, a base station (e.g., a gNB-CU) may, for example, transmit messages (e.g., random access messages associated with a RACH procedure) to a non-terrestrial base station (e.g., a gNB-DU) in the non-terrestrial network which may then be relayed to the UE or vice-versa.

A terrestrial base station e.g., a gNB-CU) and a non-terrestrial base station (e.g., a gNB-DU) may be thousands of kilometers apart and it may take some time for electromagnetic waves to propagate over the distance between the terrestrial base station (e.g., gNB-CU) and the non-terrestrial base station e.g., a gNB-DU) and the UE. The propagation delay for non-terrestrial networks may be many orders of magnitude larger than the propagation delay for terrestrial networks. As such, a round trip delay (RTD) associated with a transmission may also be orders of magnitude larger for non-terrestrial networks than for terrestrial networks. Due to the high mobility of non-terrestrial base stations (e.g., high-altitude vehicles such as non-geostationary satellites), communications with the non-geostationary satellites may promote large and time-varying RTDs, pathloss, etc. These variations may impact the reliability and the latency of random access messaging associated with a RACH procedure in the non-terrestrial network. As demand for communication efficiency increases for random access messages, the wireless communications system, such as a non-terrestrial network, may support higher reliability or lower latency random access operations, among other examples.

For example, a communication device (e.g., a base station, a UE) may be configured to handle a random access procedure in a non-terrestrial network. The communication device may be configured to use a specified TBS for a random access message (e.g., a payload of a msgA of a two-step RACH procedure) carrying control information (e.g., a BSR) with or without uplink data. In some examples, to increase a reliability and reduce a latency of random access messaging, the communication device may be further configured with a power configuration indicating a specified power ramping value to use when performing the random access procedure in the non-terrestrial network. Additionally or alternatively, the communication device may be configured with a timing configuration for updating or ignoring a timing advance when performing random access messaging in the non-terrestrial network. In some other examples, to increase the reliability of random access messaging, the communication device may be further configured to adjust a response window to monitor for a random access message (e.g., a message B (msgB) of a two-step RACH procedure) when performing the random access procedure in the non-terrestrial network.

Aspects of the disclosure are initially described in the context of wireless communications systems. Aspects of the disclosure are further illustrated by and described with reference to apparatus diagrams, system diagrams, and flowcharts that relate to random access procedures for non-terrestrial networks.

FIG. 1 illustrates an example of a wireless communications system 100 that supports random access procedures for non-terrestrial networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 122 (e.g., via an S1, N2, N3, or other interface). The base stations 105 may communicate with one another over the backhaul links 122 (e.g., via an X2, Xn, or other interface) either directly (e.g., directly between base stations 105), or indirectly (e.g., via core network 130), or both. In some examples, the backhaul links 122 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations. Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may perform a random access procedure (e.g., a RACH procedure) with a UE 115. For example, a base station 105 and a UE 115 may perform a RACH procedure to establish a connection. In other examples, a base station 105 and a UE 115 may perform a RACH procedure to re-establish a connection after connection failure (e.g., a radio-link failure) with the base station 105, or to establish a connection for handover to another base station 105, or the like. As part of the RACH procedure, a UE 115 may transmit a random access preamble. This may enable the base station 105 to distinguish between multiple UEs 115 attempting to access the wireless communications system 100 simultaneously. The base station 105 may respond with a random access response that provides an uplink resource grant, a timing advance, and a temporary cell radio network temporary identifier (C-RNTI).

The UE 115 may transmit an RRC connection request along with a temporary mobile subscriber identity (TMSI), for example, if the UE 115 has previously been connected to the same wireless network) or a random identifier. The RRC connection request may also indicate the reason the UE 115 is attempting to connect to the network (e.g., an emergency, a signaling, a data exchange, etc.). The base station 105 may respond to the connection request with a contention resolution message addressed to the UE 115, which may provide a new C-RNTI. If the UE 115 receives a contention resolution message with the correct identification, it may proceed with an RRC connection setup. If the UE 115 does not, however, receive a contention resolution message (e.g., if there is a conflict with another UE 115) it may repeat the RACH procedure by transmitting a new random access preamble. Such exchange of messages between the UE 115 and base station 105 for random access may be referred to as a four-step RACH procedure.

Alternatively, a two-step RACH procedure may be performed for random access. For example, a UE 115 may participate in a two-step RACH procedure to reduce delay in establishing communication with a base station 105 (e.g., as compared to a four-step RACH procedure). In some examples, the two-step RACH procedure may operate regardless of whether a UE 115 has a valid timing advance. For example, a UE 115 may use a valid timing advance to coordinate the timing of its transmissions to a base station 105 (e.g., to account for propagation delay) and may receive the valid timing advance as part of the two-step RACH procedure. Additionally, the two-step RACH procedure may be applicable to any cell size, may work regardless of whether the RACH procedure is contention-based or contention-free, and may combine multiple random access messages from a four-step RACH procedure. For example, a random access request message (e.g., a msgA), sent from a UE 115 to a base station 105, may combine the contents of a random access message 1 (msg1) and a random access message 3 (msg3) from the four-step RACH procedure. Additionally, the random access request message (e.g., msgA) may consist of a random access preamble and a random access payload including the contents equivalent to msg3.

The UE 115 may transmit the random access message A (msgA) of the two-step RACH procedure including the preamble on a physical random access channel (PRACH) and the payload on a physical uplink shared channel (PUSCH). In some cases, a lower limit of a payload size of the msgA may be 56 bits or 72 bits (e.g., a minimum payload size). After transmitting the msgA, the UE 115 may monitor for a random access response message (e.g., a random access message B (msgB)) from the base station 105 within a configured window (also referred to as a response window). The base station 105 may transmit a downlink control channel (e.g., a physical downlink control channel (PDCCH)) and a corresponding the msgB to the UE 115. The msgB may combine the equivalent contents of a random access message 2 (msg2) and a random access message 4 (msg4) from the four-step RACH procedure.

For a contention-free random access procedure, upon receiving the msgB from the base station 105, the UE 115 may terminate (e.g., abort) the RACH procedure. In some examples, if the UE 115 received the PDCCH with the C-RNTI, the UE 115 may transmit feedback information (e.g., a HARQ feedback) to the base station 105. Alternatively, for a contention-based random access procedure, the base station 105 may perform an early contention resolution operation. If the contention resolution is successful, upon receiving the msgB from the base station 105, the UE 115 may terminate (e.g., abort) the RACH procedure.

The wireless communications system 100 may be a terrestrial network or a non-terrestrial network, or a combination thereof. A non-terrestrial network may provide coverage by using high-altitude devices (e.g., a satellite 120) between the UE 115 and the base stations 105 (also referred to as access stations, access gateways, non-terrestrial base stations). In some examples, the base station 105 may consist of a CU (e.g., a gNB-CU) and a DU (e.g., a gNB-DU). The gNB-CU may be non-terrestrial, while the gNB-DU may be terrestrial (e.g., located on the ground). As such, there may be latency between the gNB-DU and the gNB-CU. In the wireless communications system 100, a base station 105 (e.g., a gNB-CU) may, for example, transmit messages (e.g., random access messages associated with a RACH procedure) to a non-terrestrial base station 105 (e.g., a gNB-DU) in the non-terrestrial network which may then be relayed to the UE 115 or vice-versa.

A terrestrial base station 105 (e.g., a gNB-CU) and a non-terrestrial base station 105 (e.g., a gNB-DU) may be thousands of kilometers apart and it may take some time for electromagnetic waves to propagate over the distance between the terrestrial base station 105 (e.g., gNB-CU) and the non-terrestrial base station 105 (e.g., a gNB-DU) and the UE 115. The propagation delay for non-terrestrial networks may be many orders of magnitude larger than the propagation delay for terrestrial networks. As such, an RTD associated with a transmission may also be orders of magnitude larger for non-terrestrial networks than for terrestrial networks. Due to the high mobility of non-terrestrial base stations (e.g., high-altitude vehicles such as non-geostationary satellites), communications with the non-geostationary satellites may promote large and time-varying RTDs, path-loss, etc. These variations may impact the reliability and the latency of random access messaging associated with a RACH procedure in the non-terrestrial networks.

In the example of a non-terrestrial network, a UE 115 may select between a two-step RACH procedure and a 4-step RACH procedure. When using a two-step RACH procedure in the non-terrestrial network, the base station 105 may configure (e.g., via signaling described herein) the UE 115

(or the UE 115 may be preconfigured) with a TBS configuration including one or more TBS to use for transmitting a BSR. The base station 105 may also configure (e.g., via signaling described herein) the UE 115 (or the UE 115 may be preconfigured) with a power configuration indicating a specified power ramping value to use when performing a RACH procedure in the non-terrestrial network. Additionally or alternatively, the base station 105 may further configure (e.g., via signaling described herein) the UE 115 (or the UE 115 may be preconfigured) with a timing advance configuration for updating or ignoring a timing advance when performing random access messaging in the non-terrestrial network.

In some cases, a duration of a response window associated with a RACH procedure in a terrestrial network may be insufficient for performing the RACH procedure in a non-terrestrial network. For example, an upper limit of a response window size (also referred to as msgB response window size) may be 40 ms for a RACH procedure in a terrestrial network (e.g., a maximum response window size). In non-terrestrial networks, due to the large propagation delay, in case of a contention free RACH procedure (e.g., 2-step RACH procedure) or when C-RNTI is monitored to receive the random access response message (e.g., msgB) from the base station 105, the response window may be insufficient if feedback information (e.g., a HARQ-NACK) has to be sent by the UE 115. Therefore, some adjustment in the response window may be performed by the UE 115.

Figure 2:
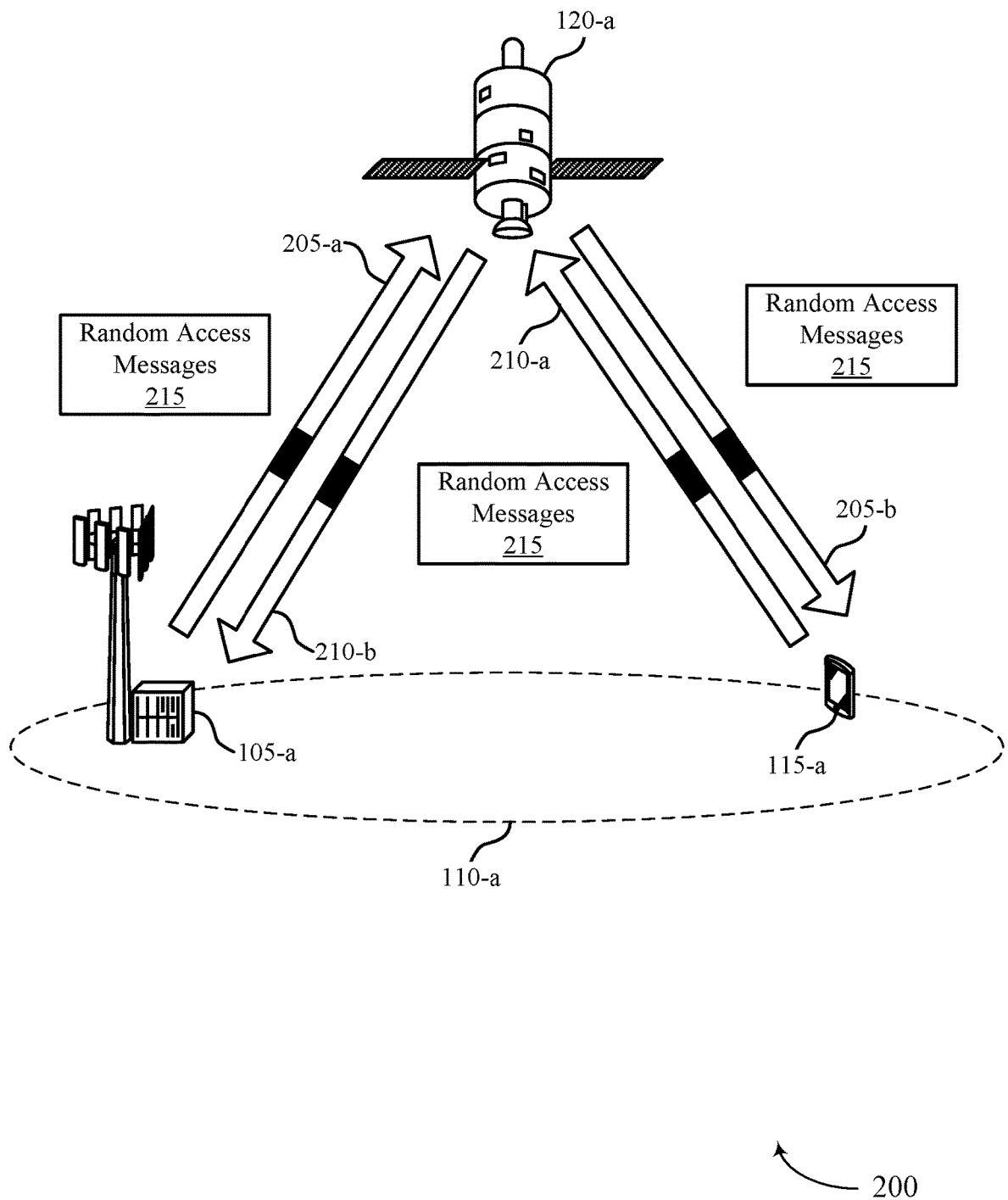

FIG. 2 illustrates an example of a wireless communications system 200 that supports random access procedures for non-terrestrial networks in accordance with aspects of the present disclosure. In some examples, the wireless communications system 200 may implement aspects of the wireless communications system 100 or may be implemented by aspects of the wireless communications system 100. The wireless communications system 200 may be an example of a terrestrial network or a non-terrestrial network, or a combination thereof. For example, the wireless communications system 200 may include a base station 105-a, a UE 115-a, and a satellite 120-a, which may be examples of a base station 105, a UE 115, and a satellite 120 as described with reference to FIG. 1. In some examples, the base station 105-a may consist of a CU (e.g., a gNB-CU) and a DU (e.g., a gNB-DU), which may be the satellite 120-a. As such, the gNB-CU may be non-terrestrial, while the gNB-DU may be terrestrial.

The wireless communications system 200 may provide a geographic coverage area 110-a by using the satellite 120-a between the base station 105-a and the UE 115-a. The base station 105-a may therefore serve a geographic coverage area 110-a with assistance of or through the satellite 120-a. In some examples, the base station 105-a may not have its own ground geographic coverage area. For example, the base station 105-a may communicate to the satellite 120-a without directly communicating to any ground user terminals, such as, for example, the UE 115-a. In some examples, a ground base station (e.g., the base station 105-a) may be a gateway (e.g., in this case, the satellite 120-a can itself function as a base station (i.e., can perform scheduling, radio link control, etc.)).

A non-terrestrial network may be absent of ground base stations that directly communicate with user terminals without relaying communications through satellites. In some other examples, a non-terrestrial network may be formed of satellites and be absent of any ground base stations. In some examples, the satellite 120-a may relay communications between the base station 105-a and the UE 115-a. For example, the base station 105-a may communicate with the UE 115-a via the satellite 120-a or vice-versa. In some examples, for communications originating at the base station 105-a and going to the UE 115-a, the base station 105-a may transmit a transmission 205-a to the satellite 120-a. The satellite 120-a may relay the transmission 205-a as a transmission 205-b to the UE 115-a. In other examples, for communications originating at the UE 115-a and going to the base station 105-a, the UE 115-a may transmit a transmission 210-a to the satellite 120-a. The satellite 120-a may relay the transmission 210-a as a transmission 210-b to base station 105-b.

One or more of the base station 105-a, the UE 115-a, and the satellite 120-a may perform a random access procedure (e.g., a RACH procedure). For example, the base station 105-a (or the satellite 120-a) and the UE 115-a may perform a RACH procedure to establish a connection. In other examples, the base station 105-a (or the satellite 120-a) and the UE 115-a may perform a RACH procedure to re-establish a connection after a connection failure (e.g., a radio-link failure) with the base station 105-a (or the satellite 120-a), or to establish a connection for handover to another base station, or the like. The base station 105-a (or the satellite 120-a) and the UE 115-a may also support multiple radio access technologies including 4G systems and 5G systems.

A RACH procedure between the base station 105-a (or the satellite 120-a) and the UE 115-a may correspond to, for example, at least one of the above example radio access technologies. By way of example, a RACH procedure may be related to 4G systems and may be referred to as a four-step RACH procedure. As part of the four-step RACH procedure, the base station 105-a (or the satellite 120-a) and the UE 115-a may transmit one or more messages (e.g., handshake messages), such as random access messages 215. The random access messages 215 may include a msg1, a msg2, a msg3, and a msg4 as described herein.

The UE 115-a may transmit a msg1, which may include a preamble that may carry information, such as a UE identifier. The purpose of the preamble transmission may be to provide an indication to the base station 105-a (or the satellite 120-a) presence of a random access attempt, and to allow the base station 105-a (or the satellite 120-a) to determine a delay (e.g., a timing delay) between the base station 105-a (or the satellite 120-a) and the UE 115-a. The UE 115-a may transmit the msg1 to the base station 105-a (or the satellite 120-a) on a PRACH, for example.

The preamble of the msg1 may, in some examples, be defined by a preamble sequence and a cyclic prefix. A preamble sequence may be defined based in part on a Zadoff-Chu sequence. The UE 115-a may use a guard period to handle timing uncertainty of the msg1 transmission. For example, before beginning the RACH procedure, the UE 115-a may obtain downlink synchronization with the base station 105-a (or the satellite 120-a) based in part on a cell-search procedure. However, because the UE 115-a has not yet obtained uplink synchronization with the base station 105-a (or the satellite 120-a), there may be an uncertainty in uplink timing due to the location of the UE 115-a in the cell (e.g., a geographic coverage area of base station 105-a (or the satellite 120-a)) not being known. Therefore, including a cyclic prefix to the msg1 may be beneficial, in some examples, for handling the uncertainty in uplink timing.

In some examples, there may be a number of preamble sequences (e.g., 64 preamble sequences) per cell (e.g. coverage area). The UE 115-a may select a preamble sequence from a set of sequences in a cell (e.g., geographic coverage area of the base station 105-*a* (or the satellite 120-*a*)) based in part on a randomness selection. In some examples, the UE 115-*a* may select a preamble sequence based in part on an amount of traffic that the UE 115-*a* has for transmission on an uplink shared channel (UL-SCH). From the preamble sequence that the UE 115-*a* selected, the base station 105-*a* (or the satellite 120-*a*) may determine the amount of uplink resources to be granted to the UE 115-*a*.

Some examples of a random access procedure may be contention-based or contention-free as described herein. When performing a contention-based random access procedure, the UE 115-*a* may select a preamble sequence from a set of sequences. That is, as long as other UEs are not performing a random access attempt using the same sequence at a same temporal instance, no collisions will occur, and the random access attempt may be detected by the base station 105-*a* (or the satellite 120-*a*). If the UE 115-*a* is performing a contention-free random access attempt, for example, for a handover to a new cell, the preamble sequence to use may be explicitly signaled (e.g., in control information) by the base station 105-*a* (or the satellite 120-*a*). To avoid collisions or interference, the base station 105-*a* (or the satellite 120-*a*) may select a contention-free preamble sequence from sequences not associated with the contention-based random access attempt.

Upon receiving the msg1, the base station 105-*a* (or the satellite 120-*a*) may respond appropriately with a msg2. For example, the base station 105-*a* (or the satellite 120-*a*) may transmit the msg2 to the UE 115-*a* on a downlink shared channel (DL-SCH) or a PDCCH. In some examples, the msg2 may have a same or a different configuration (format) compared to the msg1. The msg2 may carry information for the UE 115-*a*, where the information is determined by the base station 105-*a* (or the satellite 120-*a*) based in part on information carried in the msg1. For example, the information in the msg2 may include an index of a preamble sequence detected and for which the response is valid, a timing advance determined based in part on the preamble sequence detected, a scheduling grant indicating time and frequency resources for the UE 115-*a* to use for transmission of a next random access message transmission (e.g., a msg3) by the UE 115-*a*, or a network identifier (e.g., RA-RNTI) for further communication with the UE 115-*a*, or the like.

The msg2 may be scheduled on a PDCCH using an identity reserved for random access messaging, for example, an RA-RNTI. The UE 115-*a* may monitor the PDCCH to detect and receive the msg2. In some examples, the UE 115-*a* may monitor the PDCCH for a random access message transmission from the base station 105-*a* (or the satellite 120-*a*) during a random access response window, which may be fixed or variable in size as described herein. For example, if the UE 115-*a* does not detect and receive the msg2 transmission from the base station 105-*a* (or the satellite 120-*a*), the random access attempt may be declared as a failure and the four-step RACH procedure may repeat. However, in the subsequent attempt, the random access response window may be adjusted (e.g., increased or decreased in length (duration)) as described herein.

Once the UE 115-*a* successfully receives the msg2, the UE 115-*a* may obtain uplink synchronization with the base station 105-*a* (or the satellite 120-*a*). In some examples, before data transmission from the UE 115-*a*, a unique identifier within the cell (e.g., a C-RNTI) may be assigned to the UE 115-*a*. In some examples, the UE 115-*a* may transmit additional messages (e.g., a connection request message) for setting up the connection between the base station 105-*a* (or the satellite 120-*a*) and the UE 115-*a*. The UE 115-*a* may transmit any other messages, for example, a msg3 to the base station 105-*a* (or the satellite 120-*a*) using the UL-SCH resources (or PUSCH resources) assigned in the msg2. The msg2 may include a UE identifier for contention resolution.

The base station 105-*a* (or the satellite 120-*a*) may receive the msg3 and may respond properly, for example, by transmitting a msg4, which may be a contention resolution message. When multiple UEs (including UE 115-*a*) are performing simultaneously random access attempts using a same preamble sequence, these UEs may result in listening for a same response message (e.g., the msg4). Each UE (including UE 115-*a*) may receive the msg4 and compare an identifier (e.g., network identifier) in the msg4 to the identifier specified in the msg3. When the identifiers match, the corresponding UE (e.g., UE 115-*a*) may declare the RACH procedure successful. UEs that do not identify a match between the identifiers are considered to have failed the RACH procedure and may repeat the four-step RACH procedure with the base station 105-*a* (or the satellite 120-*a*). As a result of the four-step RACH procedure, the base station 105-*a* (or the satellite 120-*a*) and the UE 115-*a* may establish a connection.

The four-step RACH procedure may be effective for facilitating random access for the UE 115-*a*, however, there may be unnecessary latencies associated with this procedure. For example, latencies related to contention-based protocol of random access messaging may exhaust additional resources of the UE 115-*a*. The UE 115-*a* may therefore support a two-step RACH procedure with the base station 105-*a* (or the satellite 120-*a*). As part of a two-step RACH procedure, to decrease latencies related to contention-based aspects of the two-step RACH procedure, the base station 105-*a* (or the satellite 120-*a*) and the UE 115-*a* may exchange fewer messages (e.g., handshake messages) compared to the four-step RACH procedure. In the example of a two-step RACH procedure, the random access messages 215 may include a msgA (also referred to as a random access request message) and a msgB (also referred to as a random access response message). The UE 115-*a* may transmit a msgA and the base station 105-*a* (or the satellite 120-*a*) may transmit a msgB in response to the msgA. The msgA may combine parts of msg1 and msg3 of the four-step RACH procedure, while the msgB may combine aspects of msg2 and msg4 of the four-step RACH procedure.

The msgA may include a random access preamble and a random access payload, where information in the msgA includes the equivalent contents or aspects of msg3 of the four-step RACH procedure. An advantage of the two-step RACH procedure compared to the four-step RACH procedure is that the UE 115-*a* may be capable of transmitting data (e.g., via the random access payload on a PUSCH) to the base station 105-*b* (or the satellite 120-*a*). The base station 105-*a* (or the satellite 120-*a*) may monitor a PUSCH for a payload of the msgA. The random access payload may carry a connection request. In some examples, the base station 105-*a* (or the satellite 120-*a*) may determine an absence of the random access preamble or the random access payload of the msgA based in part on the monitoring. Absence of the random access preamble or the random access payload of the msgA may result in a failure of the two-step RACH procedure.

After successfully receiving the msgA, the base station 105-*b* (or the satellite 120-*a*) may construct and transmit the msgB to the UE 115-*a*. For example, the base station 105-*a* (or the satellite 120-*a*) may transmit the msgB to the UE 115-*a* on a DL-SCH, PDSCH, PDCCH. The msgB may include at least one of a network identifier of the UE 115-*a*, a timing advance, and a backoff indication for the UE 115-*a*. The backoff indication may include a timing backoff indication. The timing backoff indication may be associated with a timing of reattempting the RACH procedure (e.g., the two-step RACH procedure).

The base station 105-*a* (or the satellite 120-*a*) may transmit control information via a PDCCH to the UE 115-*a*. The UE 115-*a* may be configured to monitor a PDCCH within a search space, which may include multiple search candidates. The UE 115-*a* may be configured to monitor one or more search candidates in the search space, and may blindly decode the one or more CCEs of the search candidate to receive the control information. The UE 115-*a* may detect and decode the control information within the search space candidates. For example, the base station 105-*a* (or the satellite 120-*a*) may transmit the msgB on one or more coresets within a search space. The UE 115-*a* may monitor one or more search candidates in the one or more coresets within the search space. The UE 115-*a* may detect and decode a portion of the msgB on at least one of the coresets and based in part on the decoded coreset, the UE 115-*a* may identify a format of the msgB. Once the UE 115-*a* receives the msgB and identifies its format, the UE 115-*a* may handle the connection procedure (e.g., 2-step RACH procedure or 4-step RACH procedure) appropriately.

In some cases, the base station 105-*a* and the satellite 120-*a* may be thousands of kilometers apart and it may take some time for transmissions to propagate over the distance between the base station 105-*a* and the satellite 120-*a* and between the satellite 120-*a* and the UE 115-*a*. The propagation delay for non-terrestrial networks may be many orders of magnitude larger than the propagation delay for terrestrial networks. As such, the RTD associated with a transmission may also be orders of magnitude larger for non-terrestrial networks than for terrestrial networks. In addition, high speeds of non-geostationary satellites, for example, such as the satellite 120-*a* may promote variation in RTD. As a result, the UE 115-*a* may experience challenges with the exchange of the random access messages (e.g., msg1, msg2, msg3, msg4, msgA, and msgB) from the satellite 120-*a*.

To address the above challenges (e.g., large propagation delays) related to RACH procedure in a non-terrestrial network, the UE 115-*a* may be configured to use a specified TBS for a random access message 215 (e.g., a msgA of a two-step RACH procedure) carrying control information (e.g., a BSR) as described herein. For example, the UE 115-*a* may be configured to use a specified TBS for a random access payload of a msgA (e.g., a PUSCH payload) carrying a BSR. The BSR may include traffic information (e.g., an amount of uplink data awaiting transmission from the UE 115), among other information. In some examples, the payload may carry a BSR MAC-CE, a C-RNTI MAC-CE, or a timing advance MAC-CE, or a combination thereof. These MAC-CEs may have different sizes. For example, a BSR MAC-CE may have a size between 3 bytes and 10 bytes, a C-RNTI MAC-CE may have a size of 3 bytes, and the timing advance MAC-CE may have a size of 2 bytes. As such, when the UE 115-*a* determines to only transmit a BSR in the payload, a TBS for the payload may be 15 bytes.

The base station 105-*a* (or the satellite 120-*a*) may transmit, in a message, a configuration including an indication of a TBS specified for a RACH procedure (e.g., a two-step RACH procedure). The message may be an RRC message, a MAC-CE message, or a downlink control information (DCI) message, among other examples. A TBS may thus be specific for the RACH procedure. For example, the base station 105-*a* (or the satellite 120-*a*) may indicate to the UE 115-*a* to use a specific TBS for a two-step RACH procedure. The UE 115-*a* may then transmit a msgA of a two-step RACH according to the specified TBS. For example, the UE 115-*a* may transmit a payload of the msgA on a PUSCH according to the specified TBS. Additionally or alternatively, the configuration may include an indication of a set of TBS the UE 115-*a* may select for a random access message (e.g., a payload of msgA) of a RACH procedure (e.g. a two-step RACH procedure).

For example, the UE 115-*a* may determine a set of TBS based on the configuration. One or more TBS of the set of TBS may be configured for one or multiple random access occasions. For example, the UE 115-*a* may be configured to use a TBS for the same random access occasion (also referred to as msgA PUSCH occasion) for transmitting the random access preamble or the random access payload of the msgA. Alternatively, the UE 115-*a* may be configured to use a different TBS in different random access occasions as described herein. The set of TBS may include a first subset of TBS to use for the msgA based on msgA (e.g., payload of the msgA) carrying a BSR without uplink data. Additionally or alternatively, the set of TBS may include a second subset of TBS to use for the msgA based on the msgA (e.g., payload of the msgA) carrying a BSR with uplink data.

The UE 115-*a* may be configured with a TBS to use for a BSR and a TBS to use for uplink data. In some examples, the UE 115-*a* may select a TBS for a BSR based on the UE 115-*a* determining that an amount of uplink data to transmit does not satisfy any configured TBS. For example, the UE 115-*a* may select a TBS from a set of TBS for a msgA carrying a BSR based on the amount of uplink data in a buffer of the UE 115-*a* satisfying a TBS threshold. That is, the UE 115-*a* may select a TBS that may support the amount of uplink data in the buffer of the UE 115-*a*. In some other examples, the UE 115 may select a TBS for a BSR (i.e., without sending uplink data) using the 2-step RACH procedure when a PUSCH resource configured for the 2-step RACH procedure does not meet a logical channel prioritization (LCP) restriction of a logical channel that has uplink data to transmit (e.g., allowedSCS-List, maxPUSCH-Duration).

The base station 105-*a* (or the satellite 120-*a*) may be unaware of a TBS the UE 115-*a* is using for the msgA transmission (e.g., payload transmission) for the two-step RACH. The base station 105-*a* (or the satellite 120-*a*) may therefore perform blind decoding of various TBS from the set of TBS to receive the msgA transmitted by the UE 115-*a*. In some examples, the UE 115-*a* may be configured to partition one or more PRACH resources to indicate a TBS for a BSR associated with a msgA in the same or different random access occasion (i.e., PUSCH occasions). As such, the base station 105-*a* (or the satellite 120-*a*) may identify the TBS for the BSR associated with the msgA is the same or different for random access occasions (i.e., PUSCH occasions) of the RACH procedure. Alternatively, the UE 115-*a* may indicate a TBS for BSR based preamble grouping as described in FIG. 3.

Figure 3:
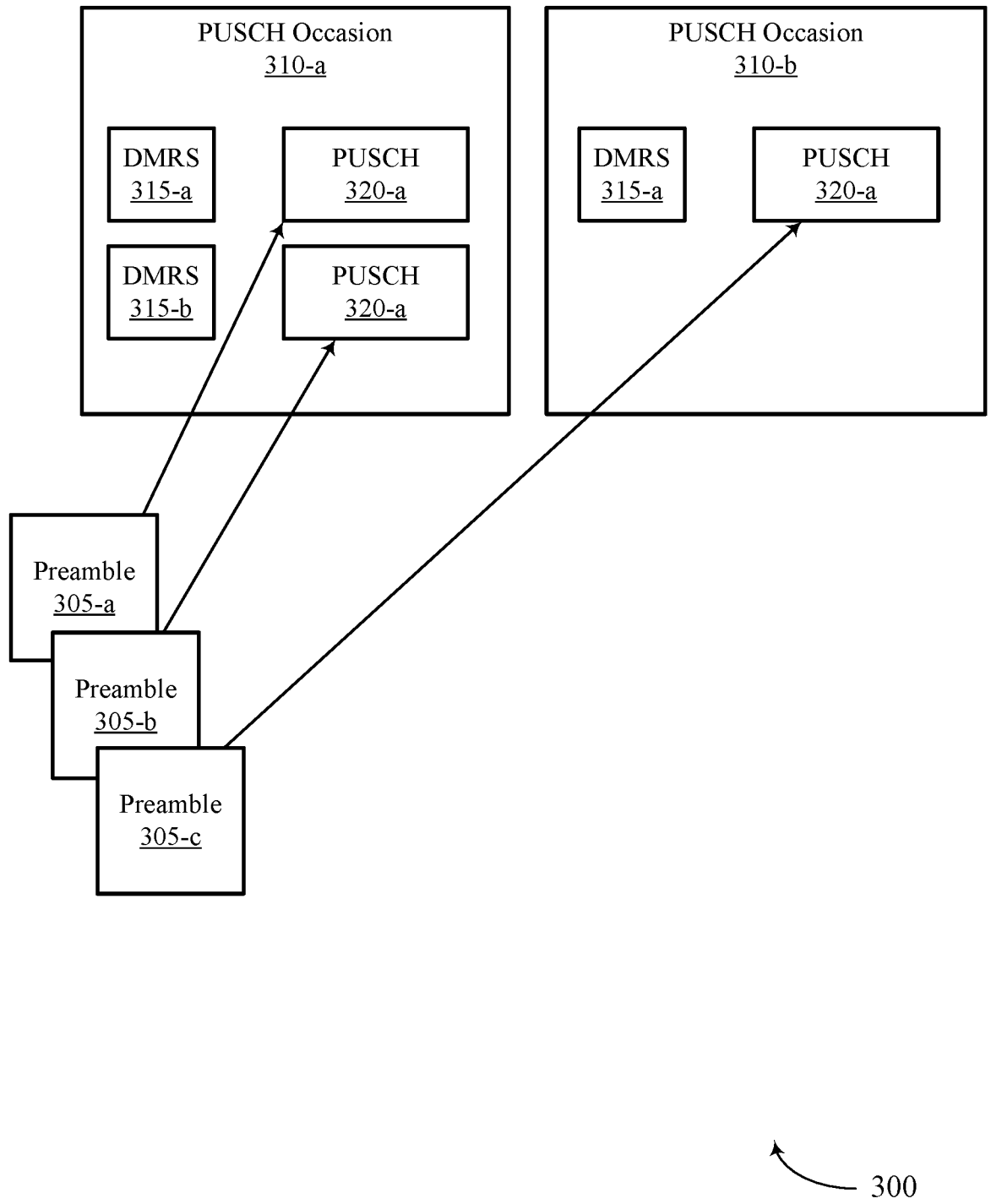
FIG. 3 illustrates an example of a preamble mapping that supports random access procedures for non-terrestrial networks in accordance with aspects of the present disclosure.

FIG. 3 illustrates an example of a preamble mapping 300 that supports random access procedures for non-terrestrial networks in accordance with aspects of the present disclosure. In some examples, the preamble mapping 300 may implement aspects of the wireless communications systems 100 or 200. For example, as discussed with reference to FIG. 2, the preamble mapping 300 may be configured by the base station 105-*a* (or the satellite 120-*a*) and may be signaled to the UE 115-a. The preamble mapping 300 may include one or more preambles 305, one or more PUSCH occasions 310 (e.g., msgA PUSCH occasions (PO)), and one or more PUSCH 320. Each PUSCH 320 may correspond to a demodulation reference signal (DMRS) 315. For example, a PUSCH 320-a may be associated with a DMRS 315-a, a PUSCH 320-b may be associated with a DMRS 315-b, and a PUSCH 320-c may be associated with a DMRS 315-c.

In the example of FIG. 3, each PUSCH 320 carrying a payload may have the same or different TBS. For example, a first payload of the PUSCH 320-a may be associated with a first TBS, a second payload of the PUSCH 320-b may be associated with a second TBS, and a third payload of the PUSCH 320-c may be associated with a third TBS. The UE 115-a may be configured to group one or more of the preambles 305 to indicate a TBS for a BSR associated with a msgA in the same or different PUSCH occasions 310. For example, the UE 115-a may be configured to group a preamble 305-a and a preamble 305-b to indicate a TBS (e.g., the first TBS or the second TBS, or both) for a BSR associated with a msgA in the PUSCH occasion 310-a. The preamble 305-a may be associated with the PUSCH 320-a, while the preamble 305-b may be associated with the PUSCH 320-b. The preamble 305-c may indicate a TBS (e.g., the third TBS) for a BSR associated with a msgA in the PUSCH occasion 310-b. The preamble 305-c may be associated with the PUSCH 320-c.

Returning to FIG. 2, the base station 105-a (or the satellite 120-a) may transmit, in a message, a power configuration indicating a specified power ramping value to use when performing a RACH procedure (e.g., the two-step RACH procedure) in the wireless communications system 200 (e.g., a non-terrestrial network). The message may include an RRC message, a MAC-CE message, or a DCI message. In some cases, the UE 115-a may be configured to adjust a transmit power level of the UE 115 based on a reference signal configuration or a serving cell configuration, or both. For a terrestrial network, if a synchronization signal block (SSB) or a channel state information reference signal (CSI-RS) is not changed from a last random access preamble transmission, the UE 115-a may adjust a transmit power level based on a power ramping parameter that may indicate a power ramping value of one (e.g., 1 dB).

In the example of FIG. 2, the UE 115-a may be configured with non-terrestrial network specific power ramping steps. For example, to improve a reliability of random access messaging in a non-terrestrial network, the UE 115-a may be configured with a larger power ramping step, for example, when operating in a GEO wireless communications system. That is, the UE 115-a may adjust a transmit power level based on a power ramping parameter (also referred to as a preamble power ramping counter) that may indicate a power ramping value greater than or equal to one (e.g., ≥1 dB). Additionally or alternatively, for a non-terrestrial network, even if the SSB or the CSI-RS selected has changed but a serving cell (e.g., associated with the base station 105-a or the satellite 120-a) has not changed from the last random access preamble transmission, the UE 115-a may adjust the transmit power level based on the power ramping parameter that may indicate the power ramping value greater than or equal to one (e.g., ≥1 dB). The UE 115-a may transmit a random access preamble on a PRACH or a random access payload on a PUSCH according to the adjusted transmit power level.

The UE 115-a may be further configured with a timing configuration for updating or ignoring a timing advance when performing a RACH procedure in the wireless communications system 200 (e.g., a non-terrestrial network). The RACH procedure may be a contention-based RACH procedure, and the UE 115-a may trigger a timing advance timer (also referred to as time alignment timer) associated with a timing advance group (TAG). In some cases, the UE 115-a may ignore a received timing advance (e.g., in msg2 of a four-step RACH procedure or a msgB of a two-step RACH procedure). However, in non-terrestrial networks, a timing advance command may have to be continuously updated by the network (e.g., the base station 105-a or the satellite 120-a) to coordinate the timing of transmissions (e.g., to account for propagation delay). Therefore, the UE 115-a might be unable ignore the timing advance. As such, regardless of a timing advance timer running, the UE 115-a may be configured to update a timing advance and restart or start the timing advance timer. Alternatively, the UE 115-a may be configured to ignore the timing advance when the timing advance timer is running. In some other examples, the UE 115-a may be further configured to adjust a response window to monitor for a response message, such as a random access response message (e.g., a msg2 or msg4, of four-step RACH procedure or a msgB of a two-step RACH procedure) when performing a RACH procedure in the wireless communications system 200 (e.g., a non-terrestrial network) as described in FIG. 4.

Figure 4:
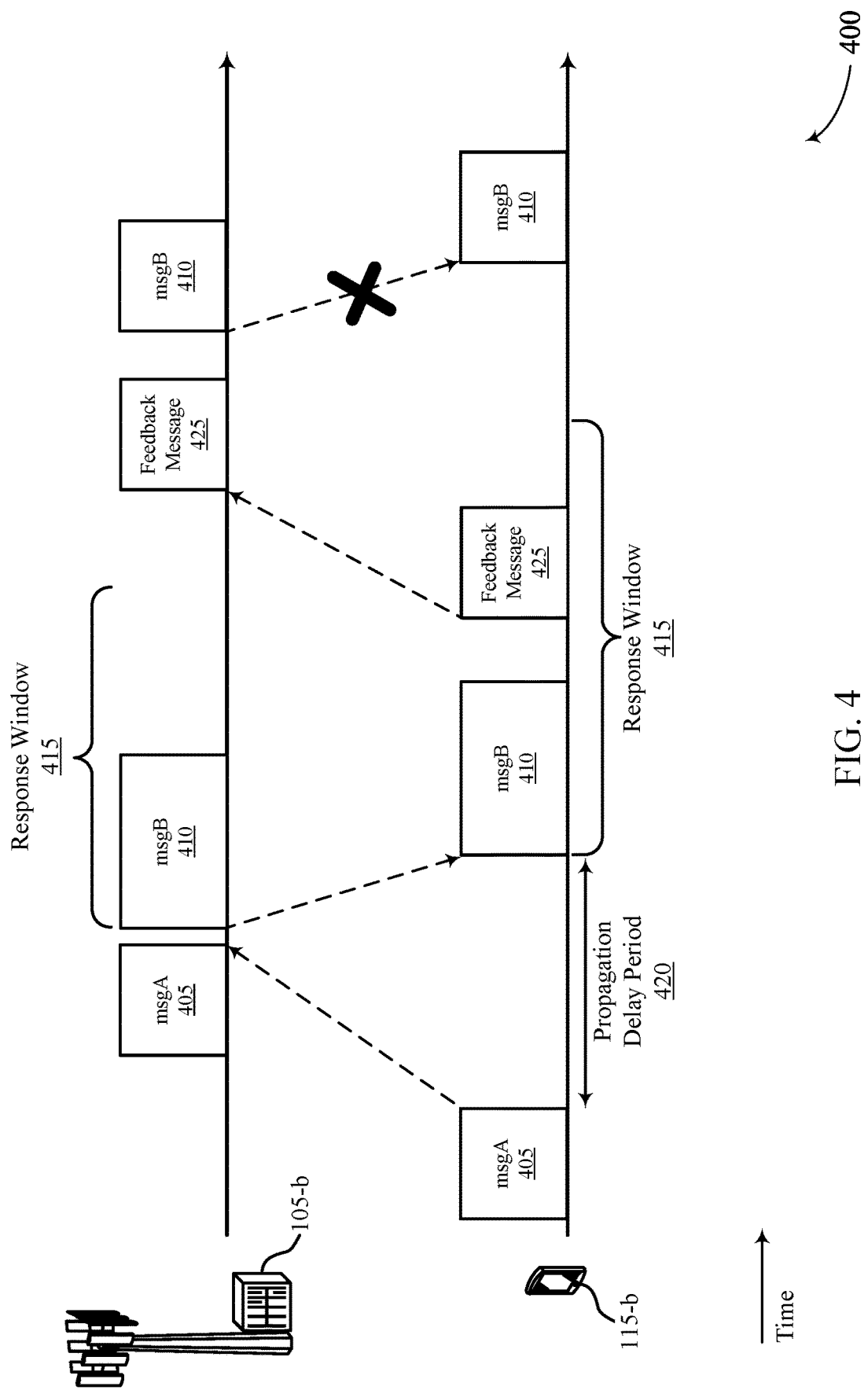
FIG. 4 illustrates an example of a transmission timeline that supports random access procedures for non-terrestrial networks in accordance with aspects of the present disclosure.

FIG. 4 illustrates an example of a transmission timeline 400 that supports random access procedures for non-terrestrial networks in accordance with aspects of the present disclosure. The transmission timeline 400 may be implemented by aspects of the wireless communications systems 100 and 200 or may implement aspects of the wireless communications systems 100 and 200 as described with reference to FIGS. 1 and 2, respectively. For example, the transmission timeline 400 may be based on a configuration by a base station 105-b or a UE 115-b, and implemented by the UE 115-b. The base station 105-b and the UE 115-b may be examples of devices, as described herein. The transmission timeline 400 may be implemented by the base station 105-b and the UE 115-b to support efficient random access procedures, among other benefits.

In the example of FIG. 4, the transmission timeline 400 may illustrate random access messaging associated with a two-step RACH procedure. The UE 115-b may transmit a msgA 405 to the base station 105-b in a non-terrestrial network. In response to transmitting the msgA 405, the UE 115-b may monitor for a reply from the base station 105-b during a response window 415 (also referred to as a contention resolution window). The base station 105-b may transmit a msgB 410 during the response window 415 to the UE 115-b. In some examples, there may be a propagation delay period 420. The UE 115-b may transmit a feedback message 425 to the base station 105-b. For example, the feedback message 425 may include HARQ information, such as a HARQ-ACK or a HARQ-NACK.

In the example of FIG. 4, the feedback message 425 may be a HARQ-NACK. The base station 105-b may receive the feedback message 425 and in response transmit (e.g., retransmit) a msgB 410 to the UE 115-b. For a msgB PDCCH with C-RNTI, the HARQ information to the msgB physical downlink shared channel (PDSCH) may include a HARQ-ACK or a HARQ-NACK. The UE 115-b can send a HARQ-NACK when a time alignment timer is running and has a valid physical uplink control channel (PUCCH) resource. But for HARQ-ACK, the UE 115-b can apply a provided timing advance and send HARQ ACK. In this case (e.g., if a downlink assignment has been received on the PDCCH for the C-RNTI and the received transport block is not successfully decoded), a current size of a response window (e.g., an upper limit of a duration of 40*ms*) might not be sufficient as illustrated in FIG. 4. In other words, the UE 115-*b* may not receive the msgB 410 because the response window 415 lapsed and the UE 115-*b* is no longer monitoring for msgB transmissions from the base station 105-*b*.

To address the above challenges, the UE 115-*b* may be configured to adjust (e.g., extend) a duration of the response window 415. In some examples, the UE 115-*b* may extend the duration of the response window 415 when the HARQ information in the feedback message 425 is a HARQ-NACK. In some examples, the UE 115 may extend the response window 415 by an offset corresponding to an RTD. Alternatively, the UE 115 may restart the response window 415 transmitting the feedback message 425 including a HARQ-NACK. In some examples, if a HARQ-NACK is transmitted in the feedback message 425 by the UE 115-*b*, the UE 115-*b* may start an offset timer corresponding to an RTD to monitor for a retransmission of the msgB 410. The UE 115-*b* may start the offset timer after transmitting the feedback message 425 including the HARQ-NACK, or after the response window 415 expires. In some other examples, the UE 115-*b* may be configured with a set of duration values of the response window 415. That is, each duration value of the set for a msgB response window may be configured for the UE 115-*b* and correspond to a respective RTD value. The UE 115-*b* may be configured to declare a result of the two-step RACH procedure as successful and the UE 115-*b* may keep monitoring a PDCCH addressed to the C-RNTI.

The UE 115-*b* may thus be configured to support improvements for a random access procedures in a non-terrestrial network. The described techniques may also provide improvements to power consumption and, in some examples, may promote higher reliability and lower latency random access operations in a non-terrestrial network, among other benefits. The UE 115-*b* may thus be configured to support improvements for random access procedures (e.g., a two-step RACH procedure) in a non-terrestrial network.

Figure 5:
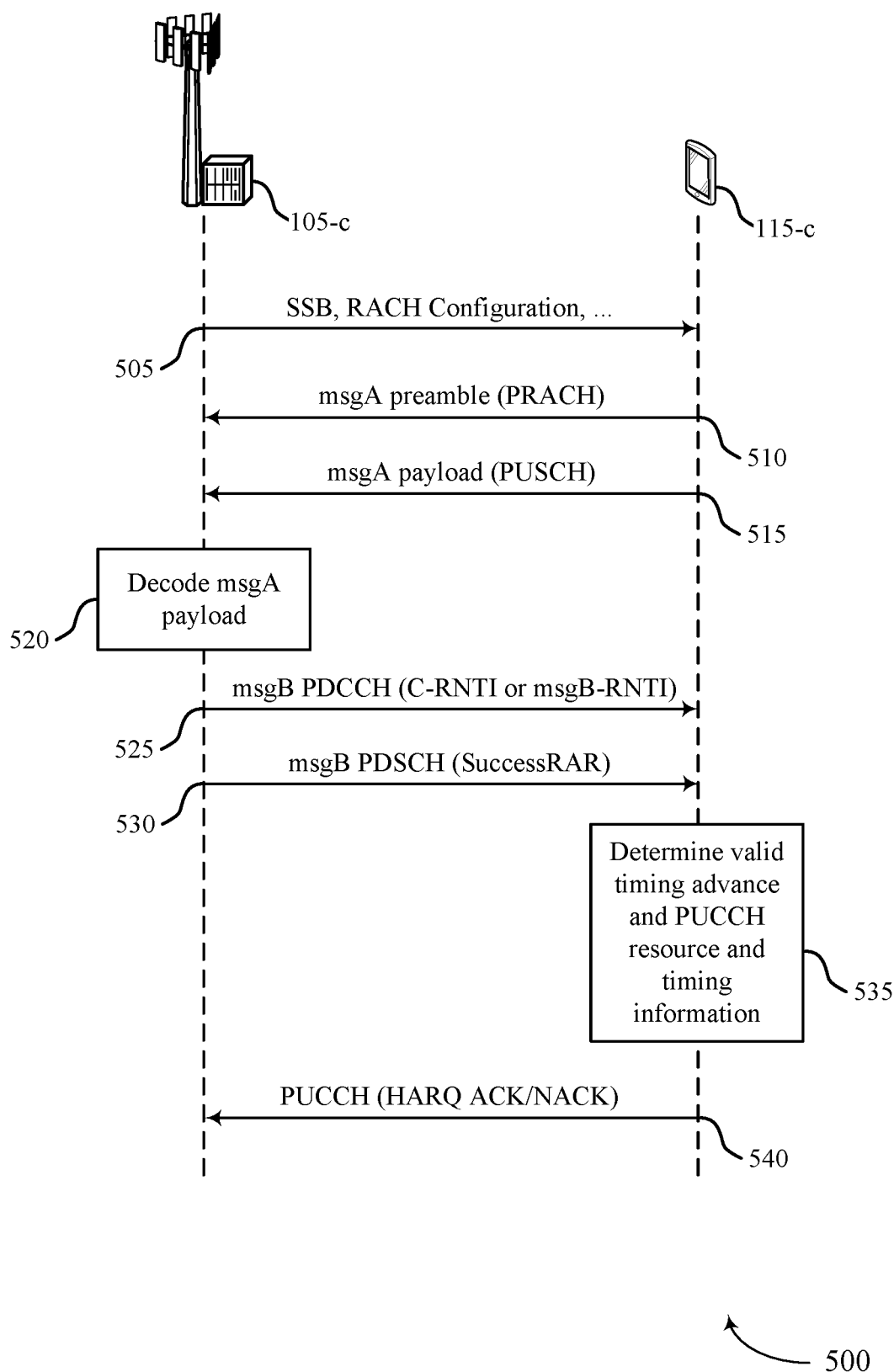
FIG. 5 illustrates an example of a process flow that supports random access procedures for non-terrestrial networks in accordance with aspects of the present disclosure.

FIG. 5 illustrates an example of a process flow 500 that supports random access procedures for non-terrestrial networks in accordance with aspects of the present disclosure. The process flow 500 may implement be implemented by aspects of the wireless communications systems 100 and 200 or may aspects of the wireless communications system 100 and 200 described with reference to FIGS. 1 and 2, respectively. For example, the process flow 500 may be based on a configuration by a base station 105-*c* or a UE 115-*c*, and implemented by the UE 115-*c*. The base station 105-*c* or the UE 115-*c* may be examples of devices, as described herein.

The base station 105-*c* and the UE 115-*c* may perform a RACH procedure, such as a two-step RACH procedure. In the following description of the process flow 500, the operations between the base station 105-*c* or the UE 115-*c* may be transmitted in a different order than the example order shown, or the operations performed by the base station 105-*c* or the UE 115-*c* may be performed in different orders or at different times. Some operations may also be omitted from the process flow 500, and other operations may be added to the process flow 500.

At 505, the base station 105-*c* may transmit an SSB, a RACH configuration, among other information, to the UE 115-*c*. At 510, the UE 115-*c* may transmit a msgA preamble, for example, on a PRACH as described herein. At 515, the UE 115-*c* may transmit a msgA payload, for example, on a PUSCH as described herein. At 520, the base station 105-*c* may decode the msgA payload. At 525, the base station 105-*c* may transmit a msgB PDCCH including a C-RNTI or a msgB-RNTI. At 525, the base station 105-*c* may transmit a msgB PDSCH including an indication of a result of the RACH procedure (e.g., a success RAR). At 535, the UE 115-*c* may determine valid timing advance and PUCCH resource and timing information. At 540, the UE 115-*c* may transmit feedback information on a PUCCH (e.g., HARQ ACK/NACK) as described herein.

Figure 6:
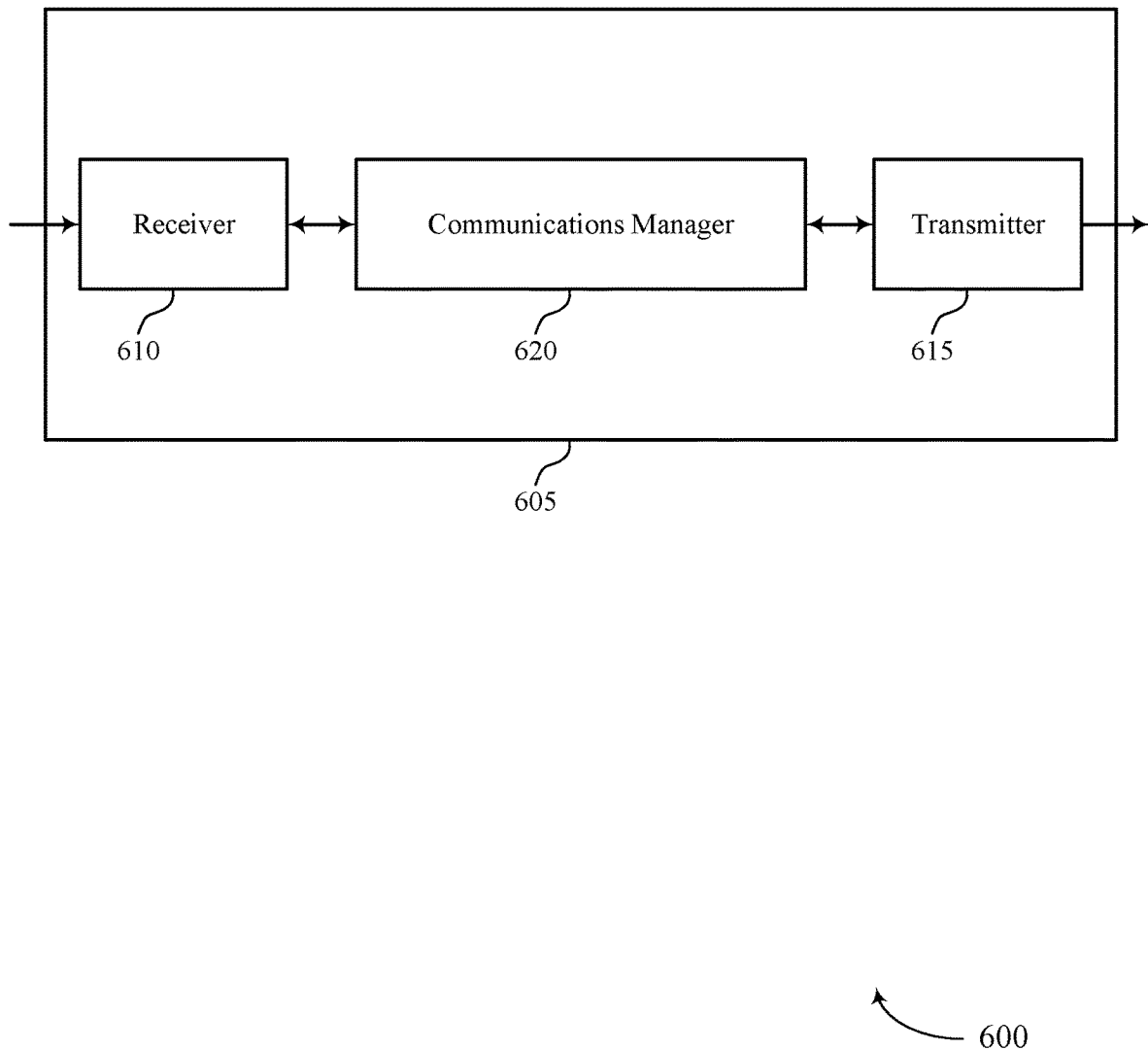
FIGS. 6 and 7 show block diagrams of devices that support random access procedures for non-terrestrial networks in accordance with aspects of the present disclosure.

FIG. 6 shows a block diagram 600 of a device 605 that supports random access procedures for non-terrestrial networks in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to random access procedures for non-terrestrial networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to random access procedures for non-terrestrial networks). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of random access procedures for non-terrestrial networks as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting, to a base station of a non-terrestrial network, a random access request message associated with a random access procedure using a TBS and a power control specified for the random access request message for the random access procedure, the random access request message including a random access preamble and a random access payload carrying a BSR or uplink data, or both. The communications manager 620 may be configured as or otherwise support a means for monitoring a response window based on transmitting the random access request message. The communications manager 620 may be configured as or otherwise support a means for receiving, from the base station of the non-terrestrial network, a response message of the random access procedure during the response window.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for efficient random access operations during a random access procedure in a non-terrestrial network, reduced power consumption for random access operations during the random access procedure in the non-terrestrial network, among other benefits (e.g., more efficient utilization of communication resources).

Figure 7:
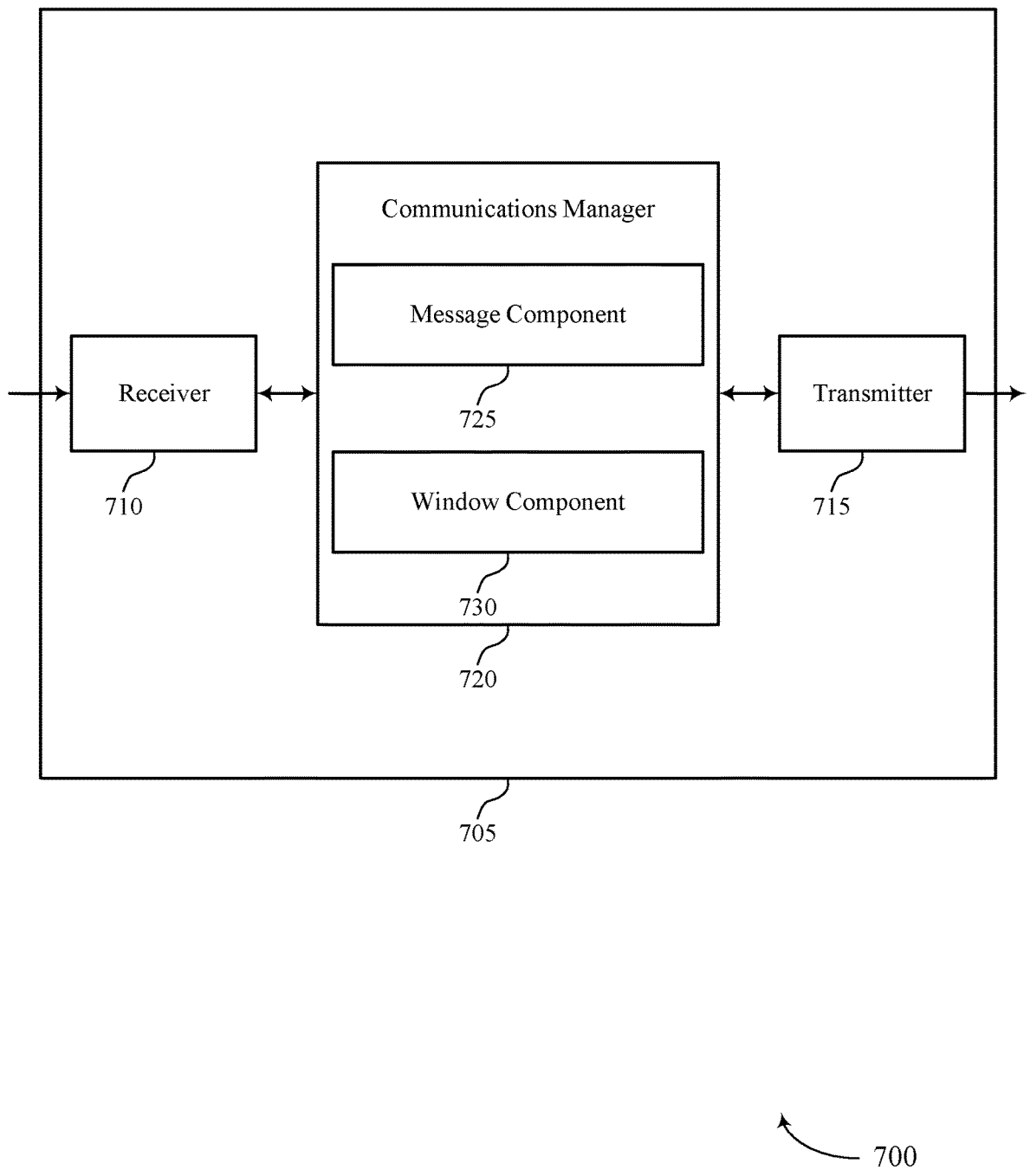

FIG. 7 shows a block diagram 700 of a device 705 that supports random access procedures for non-terrestrial networks in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to random access procedures for non-terrestrial networks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to random access procedures for non-terrestrial networks). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of random access procedures for non-terrestrial networks as described herein. For example, the communications manager 720 may include a message component 725 a window component 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The message component 725 may be configured as or otherwise support a means for transmitting, to a base station of a non-terrestrial network, a random access request message associated with a random access procedure using a TBS specified and a power control for the random access request message for the random access procedure, the random access request message including a random access preamble and a random access payload carrying a BSR or uplink data, or both. The window component 730 may be configured as or otherwise support a means for monitoring a response window based on transmitting the random access request message. The message component 725 may be configured as or otherwise support a means for receiving, from the base station of the non-terrestrial network, a response message of the random access procedure during the response window.

Figure 8:
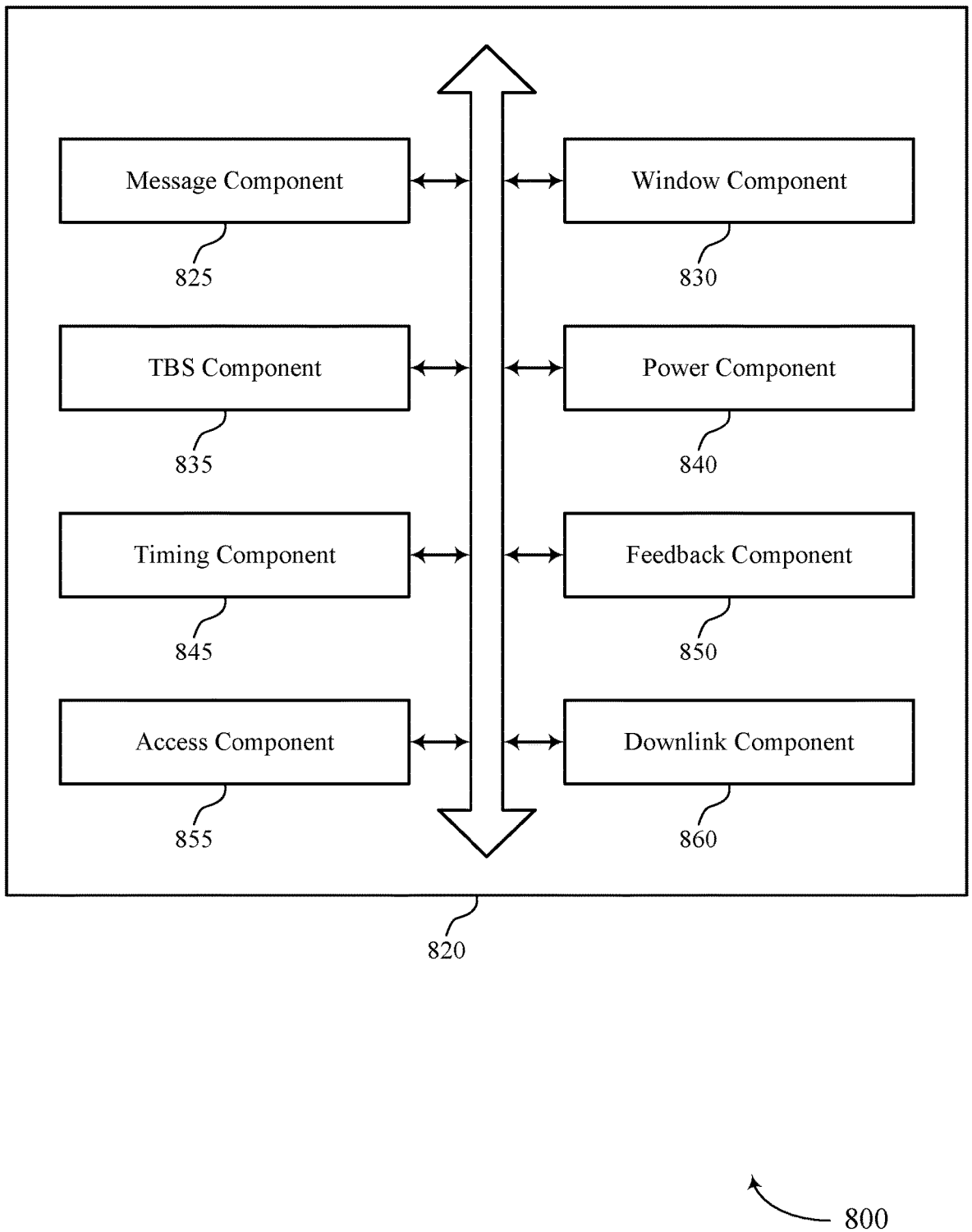
FIG. 8 shows a block diagram of a communications manager that supports random access procedures for non-terrestrial networks in accordance with aspects of the present disclosure.

FIG. 8 shows a block diagram 800 of a communications manager 820 that supports random access procedures for non-terrestrial networks in accordance with aspects of the present disclosure. The communications manager 820 may be an example of aspects of a communications manager 620, a communications manager 720, or both, as described herein. The communications manager 820, or various components thereof, may be an example of means for performing various aspects of random access procedures for non-terrestrial networks as described herein. For example, the communications manager 820 may include a message component 825, a window component 830, a TBS component 835, a power component 840, a timing component 845, a feedback component 850, an access component 855, a downlink component 860, or any combination thereof. Each of these components may communicate, directly or indirectly, with one another (e.g., via one or more buses).

The communications manager 820 may support wireless communication at a UE in accordance with examples as disclosed herein. The message component 825 may be configured as or otherwise support a means for transmitting, to a base station of a non-terrestrial network, a random access request message associated with a random access procedure using a TBS and a power control specified for the random access request message for the random access procedure. The random access request message including a random access preamble and a random access payload carrying a BSR or uplink data, or both. The window component 830 may be configured as or otherwise support a means for monitoring a response window based on transmitting the random access request message. In some examples, the message component 825 may be configured as or otherwise support a means for receiving, from the base station of the non-terrestrial network, a response message of the random access procedure during the response window. In some examples, the TBS component 835 may be configured as or otherwise support a means for receiving, in a message, a configuration including an indication of the TBS specified for the random access payload carried in the random access request message for the random access procedure, the message including an RRC message, a MAC-CE message, or a DCI message. The message component 825 may be configured as or otherwise support a means for transmitting the random access payload on a PUSCH based on the TBS specified for the random access procedure.

The TBS component 835 may be configured as or otherwise support a means for determining a set of TBSs based on a configuration, where the set of TBSs includes a first subset of TBSs to use for the random access payload based on the random access payload carrying the BSR without the uplink data, and a second subset of TBSs to use for the random access payload based on the random access payload carrying the uplink data without the BSR. In some examples, the TBS component 835 may be configured as or otherwise support a means for selecting the TBS from the set of TBSs based on the random access payload carrying the BSR without the uplink data or the random access payload carrying the BSR with the uplink data. In some examples, the message component 825 may be configured as or otherwise support a means for transmitting the random access payload on a PUSCH based on the selecting of the TBS.

In some examples, the selecting of the TBS from the set of TBSs for the random access payload carrying the BSR without the uplink data is based on the uplink data satisfying a TBS threshold. In some examples, the selecting of the TBS from the set of TBSs for the random access payload carrying the BSR without the uplink data is based on a PUSCH resource configured for the random access procedure failing to satisfy an LCP associated with a logical channel for the uplink data. In some examples, the first subset of TBSs is configured for a first PUSCH occasion associated with the random access procedure and the second subset of TBSs is configured for a second PUSCH occasion associated with the random access procedure, the first PUSCH occasion is different than the second PUSCH occasion.

In some examples, the TBS component 835 may be configured as or otherwise support a means for determining the TBS for the random access payload carrying the BSR based on a preamble associated with the random access request message. In some examples, the message component 825 may be configured as or otherwise support a means for transmitting the random access payload on a PUSCH, based on the determining of the TBS for the random access payload, during a first PUSCH occasion associated the random access procedure or a second PUSCH occasion associated the random access procedure, or both.

In some examples, the TBS component 835 may be configured as or otherwise support a means for determining the TBS for the random access payload carrying the BSR based on a partitioning of a set of PRACH resources or a grouping of a set of random access preambles including the random access preamble associated with the random access procedure. In some examples, the message component 825 may be configured as or otherwise support a means for transmitting the random access payload on a PUSCH, based on the determining of the TBS for the random access payload, during a first PUSCH occasion associated the random access procedure or a second PUSCH occasion associated the random access procedure, or both.

The power component 840 may be configured as or otherwise support a means for receiving, in a message, a configuration including an indication of a power ramping parameter specified to use for the non-terrestrial network. In some examples, the message component 825 may be configured as or otherwise support a means for transmitting of the random access request message associated with the random access procedure based on the power ramping parameter specified for the non-terrestrial network. In some examples, the power component 840 may be configured as or otherwise support a means for adjusting a transmit power level based on the power ramping parameter and a reference signal configuration including an SSB or a CSI-RS. In some examples, the message component 825 may be configured as or otherwise support a means for transmitting the random access preamble on a PRACH or the random access payload on a PUSCH, or both, based on the adjusting of the transmit power level.

In some examples, the power component 840 may be configured as or otherwise support a means for adjusting a transmit power level based on the power ramping parameter, a reference signal configuration, or a serving cell configuration, or a combination thereof, where the reference signal configuration is different for the random access preamble and a previous random access preamble transmission, and the serving cell configuration is the same for the random access preamble and the previous random access preamble transmission. In some examples, the message component 825 may be configured as or otherwise support a means for transmitting the random access preamble on a PRACH or the random access payload on a PUSCH, or both, based on the adjusting of the transmit power level.

The timing component 845 may be configured as or otherwise support a means for receiving, from the base station of the non-terrestrial network, a timing advance command or any other downlink data (e.g., PDSCH data) in the response message of the random access procedure. In some examples, the TBS and the power control (e.g., power ramping parameter) are specified for the random access payload of the random access request message for the random access procedure. In some examples, the timing component 845 may be configured as or otherwise support a means for restarting a timing advance timer regardless of a status of the timing advance timer based on the receiving of the timing advance command in the response message of the random access procedure. In some examples, the timing component 845 may be configured as or otherwise support a means for configuring whether the UE determines the status of the timing advance timer after receiving the timing advance command, where restarting the timing advance timer is based on the configuring.

The feedback component 850 may be configured as or otherwise support a means for transmitting feedback information associated with the response message. In some examples, the response message is received on a PDSCH addressed to a C-RNTI, and the feedback information includes a HARQ acknowledgement (HARQ-ACK) or a HARQ non-acknowledgement (HARQ-NACK). In some examples, the window component 830 may be configured as or otherwise support a means for adjusting a duration of the response window based on an offset value and the feedback information including the HARQ-NACK. In some examples, the window component 830 may be configured as or otherwise support a means for monitoring the response window based on the adjusting of the duration of the response window. In some examples, the message component 825 may be configured as or otherwise support a means for receiving a retransmission of the response message of the random access procedure during the response window.

The window component 830 may be configured as or otherwise support a means for receiving, in a message, a configuration including an indication of a value of a set of values for the duration of the response window, where each value of the set of values for the duration of the response window correspond to a respective RTD value associated with a communication link of the non-terrestrial network. In some examples, the window component 830 may be configured as or otherwise support a means for where the adjusting of the duration of the response window is based on the configuration. In some examples, the window component 830 may be configured as or otherwise support a means for restarting the response window based on the feedback information including the HARQ-NACK.

In some examples, the timing component 845 may be configured as or otherwise support a means for enabling an offset timer to monitor for a retransmission of the response message based on the transmitting of the feedback information or the response window expiring, or both. In some examples, the access component 855 may be configured as or otherwise support a means for determining that the random access procedure is successful based on the receiving of the response message. In some examples, the downlink component 860 may be configured as or otherwise support a means for monitoring a PDCCH addressed to the C-RNTI based on the determining that the random access procedure is successful.

Figure 9:
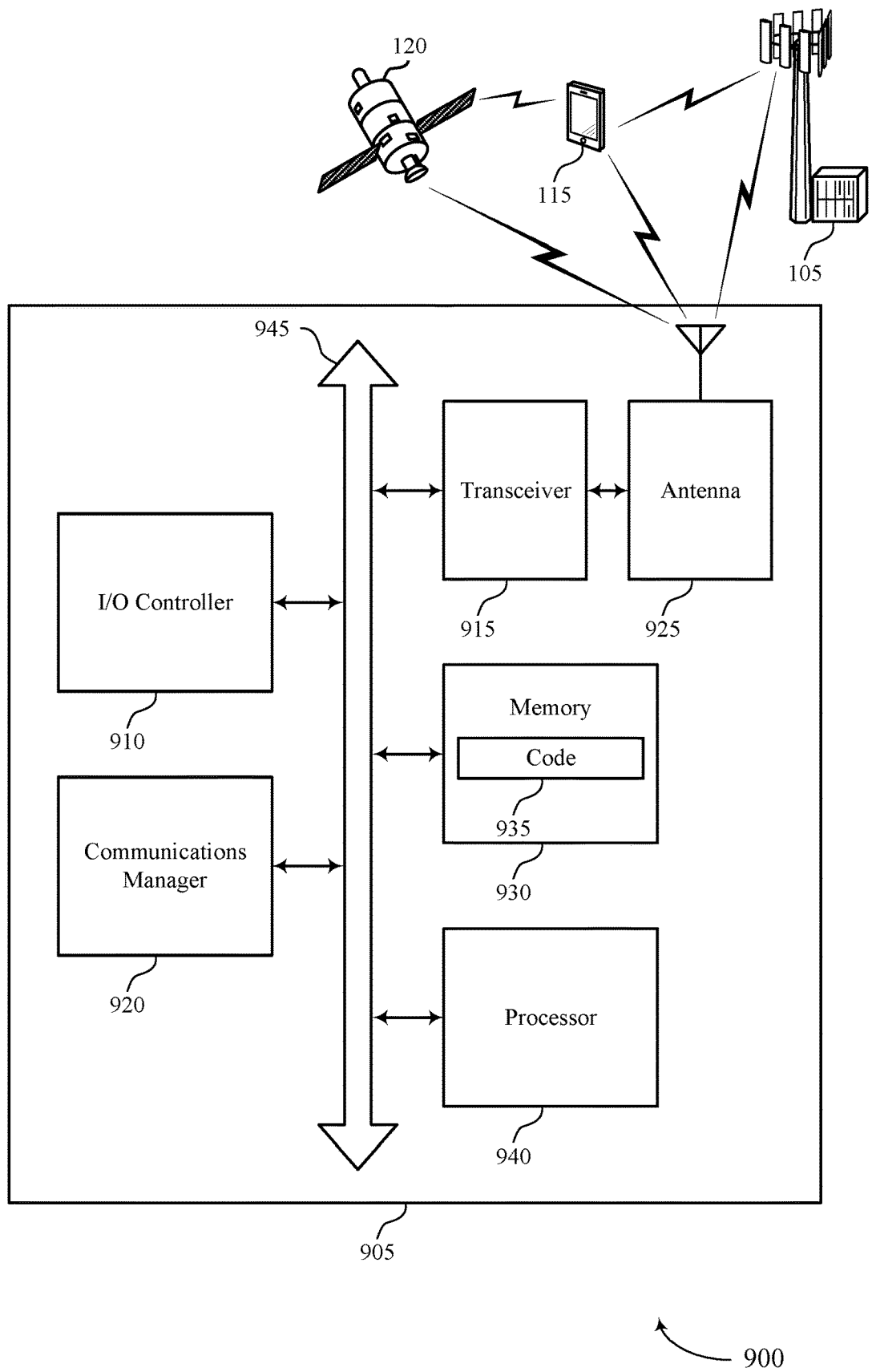
FIG. 9 shows a diagram of a system including a device that supports random access procedures for non-terrestrial networks in accordance with aspects of the present disclosure.

FIG. 9 shows a diagram of a system 900 including a device 905 that supports random access procedures for non-terrestrial networks in accordance with aspects of the present disclosure. The device 905 may be an example of or include the components of a device 605, a device 705, or a UE 115 as described herein. The device 905 may communicate wirelessly with one or more base stations 105, UEs 115, satellites 120, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting random access procedures for non-terrestrial networks). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, to a base station of a non-terrestrial network, a random access request message associated with a random access procedure using a TBS and a power control specified for the random access request message for the random access procedure, the random access request message including a random access preamble and a random access payload carrying a BSR or uplink data, or both. The communications manager 920 may be configured as or otherwise support a means for monitoring a response window based on transmitting the random access request message. The communications manager 920 may be configured as or otherwise support a means for receiving, from the base station of the non-terrestrial network, a response message of the random access procedure during the response window. By including or configuring the communications manager 920 in accordance with examples as described herein, the device 905 may support techniques for efficient random access operations for a random access procedure in a non-terrestrial network, improved random access messaging reliability, reduced random access messaging latency, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of random access procedures for non-terrestrial networks as described herein, or the processor 940 and the memory 930 may be otherwise configured to perform or support such operations.

Figure 10:
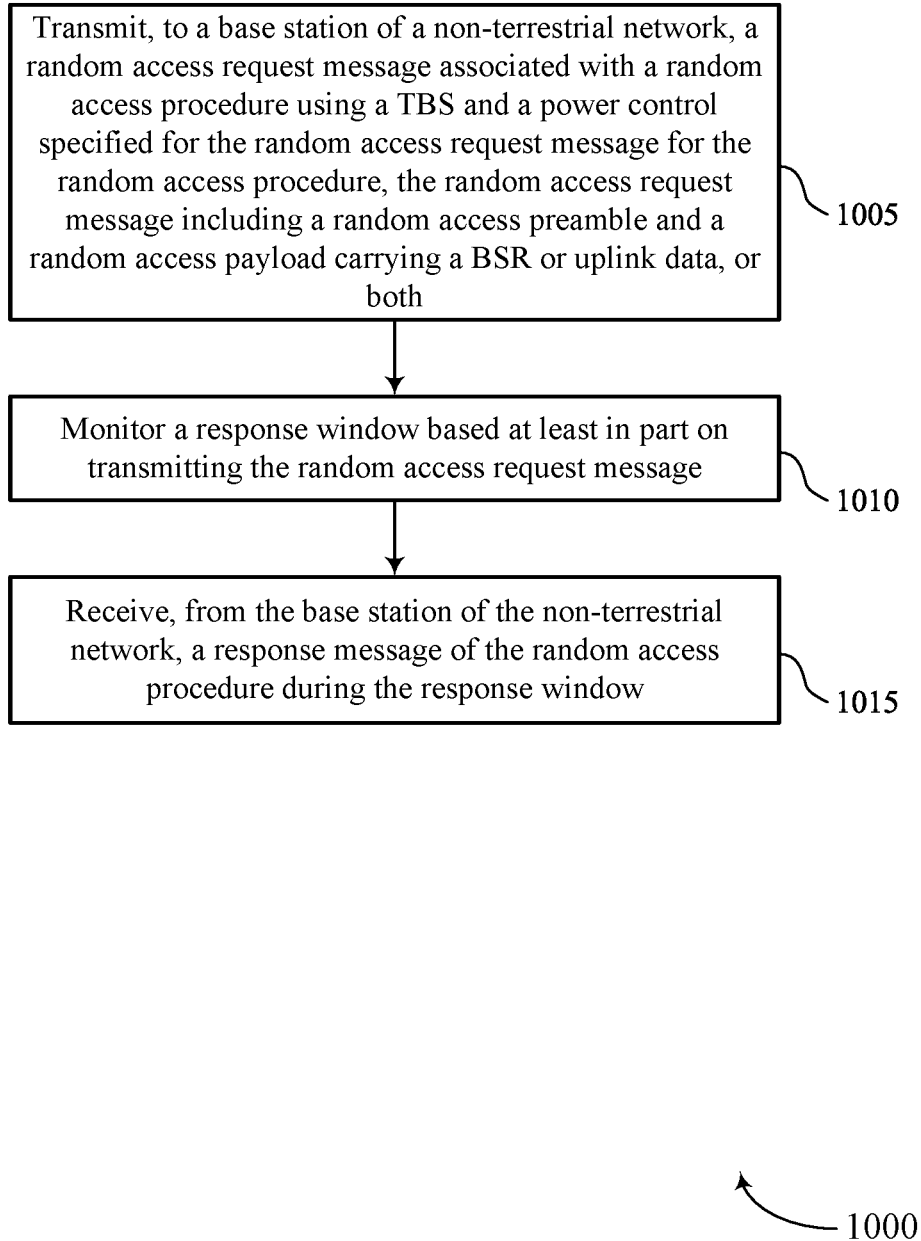
FIGS. 10 through 13 show flowcharts illustrating methods that support random access procedures for non-terrestrial networks in accordance with aspects of the present disclosure.

FIG. 10 shows a flowchart illustrating a method 1000 that supports random access procedures for non-terrestrial networks in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include transmitting, to a base station of a non-terrestrial network, a random access request message associated with a random access procedure using a TBS and a power control specified for the random access request message for the random access procedure, the random access request message including a random access preamble and a random access payload carrying a BSR or uplink data, or both. The operations of 1005 may be performed in accordance with examples as disclosed herein. In some examples, aspects of the operations of 1005 may be performed by a message component 825 as described with reference to FIG. 8.

At 1010, the method may include monitoring a response window based on transmitting the random access request message. The operations of 1010 may be performed in accordance with examples as disclosed herein. In some examples, aspects of the operations of 1010 may be performed by a window component 830 as described with reference to FIG. 8.

At 1015, the method may include receiving, from the base station of the non-terrestrial network, a response message of the random access procedure during the response window. The operations of 1015 may be performed in accordance with examples as disclosed herein. In some examples, aspects of the operations of 1015 may be performed by a message component 825 as described with reference to FIG. 8.

Figure 11:
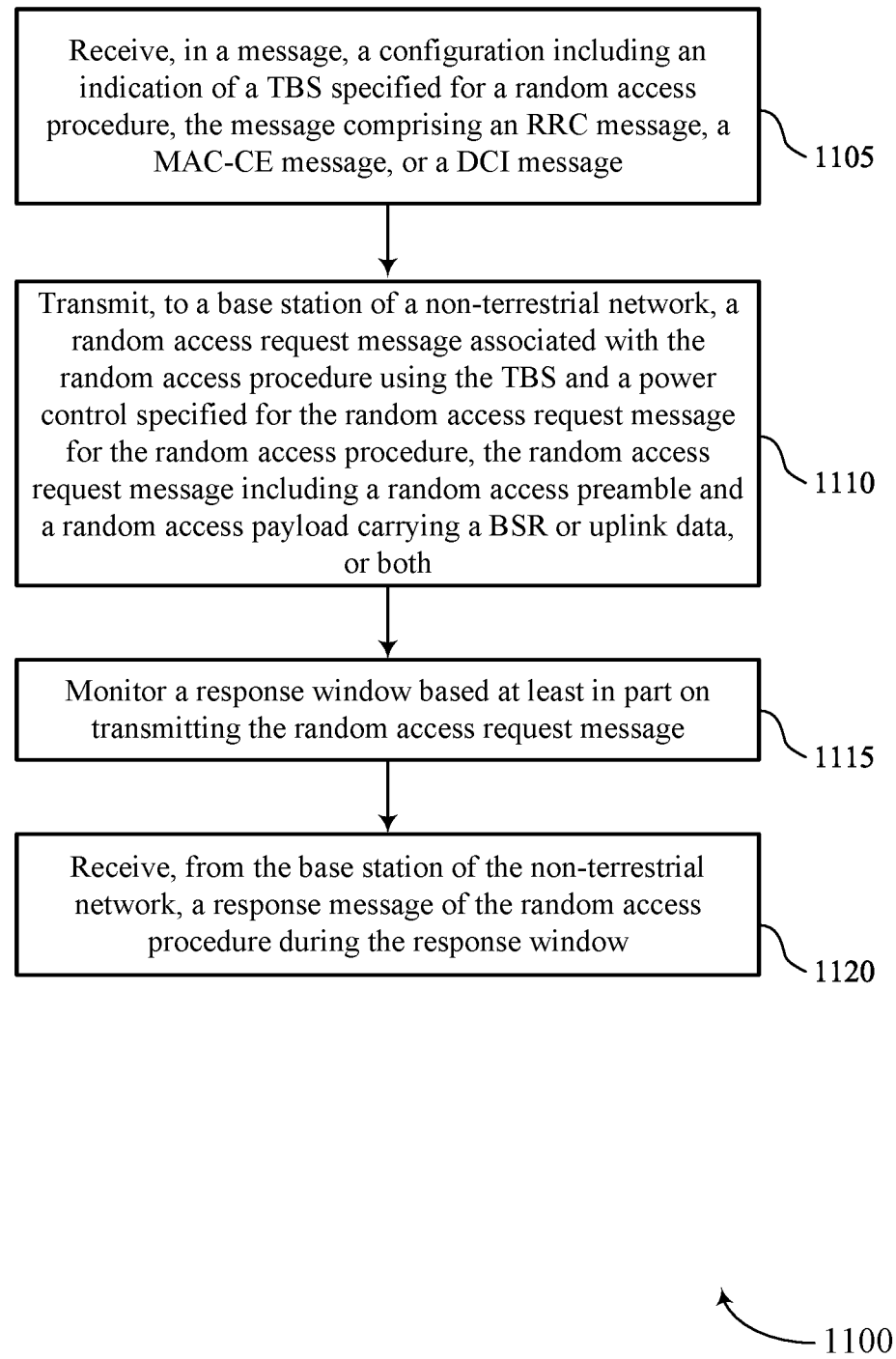

FIG. 11 shows a flowchart illustrating a method 1100 that supports random access procedures for non-terrestrial networks in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, in a message, a configuration including an indication of a TBS specified for a random access procedure, the message comprising an RRC message, a MAC-CE message, or a DCI message. The operations of 1105 may be performed in accordance with examples as disclosed herein. In some examples, aspects of the operations of 1105 may be performed by a TBS component 835 as described with reference to FIG. 8.

At 1110, the method may include transmitting, to a base station of a non-terrestrial network, a random access request message associated with the random access procedure using the TBS and a power control specified for the random access request message for the random access procedure, the random access request message including a random access preamble and a random access payload carrying a BSR or uplink data, or both. The operations of 1110 may be performed in accordance with examples as disclosed herein. In some examples, aspects of the operations of 1110 may be performed by a message component 825 as described with reference to FIG. 8.

At 1115, the method may include monitoring a response window based on transmitting the random access request message. The operations of 1115 may be performed in accordance with examples as disclosed herein. In some examples, aspects of the operations of 1115 may be performed by a window component 830 as described with reference to FIG. 8.

At 1120, the method may include receiving, from the base station of the non-terrestrial network, a response message of the random access procedure during the response window. The operations of 1120 may be performed in accordance with examples as disclosed herein. In some examples, aspects of the operations of 1120 may be performed by a message component 825 as described with reference to FIG. 8.

Figure 12:
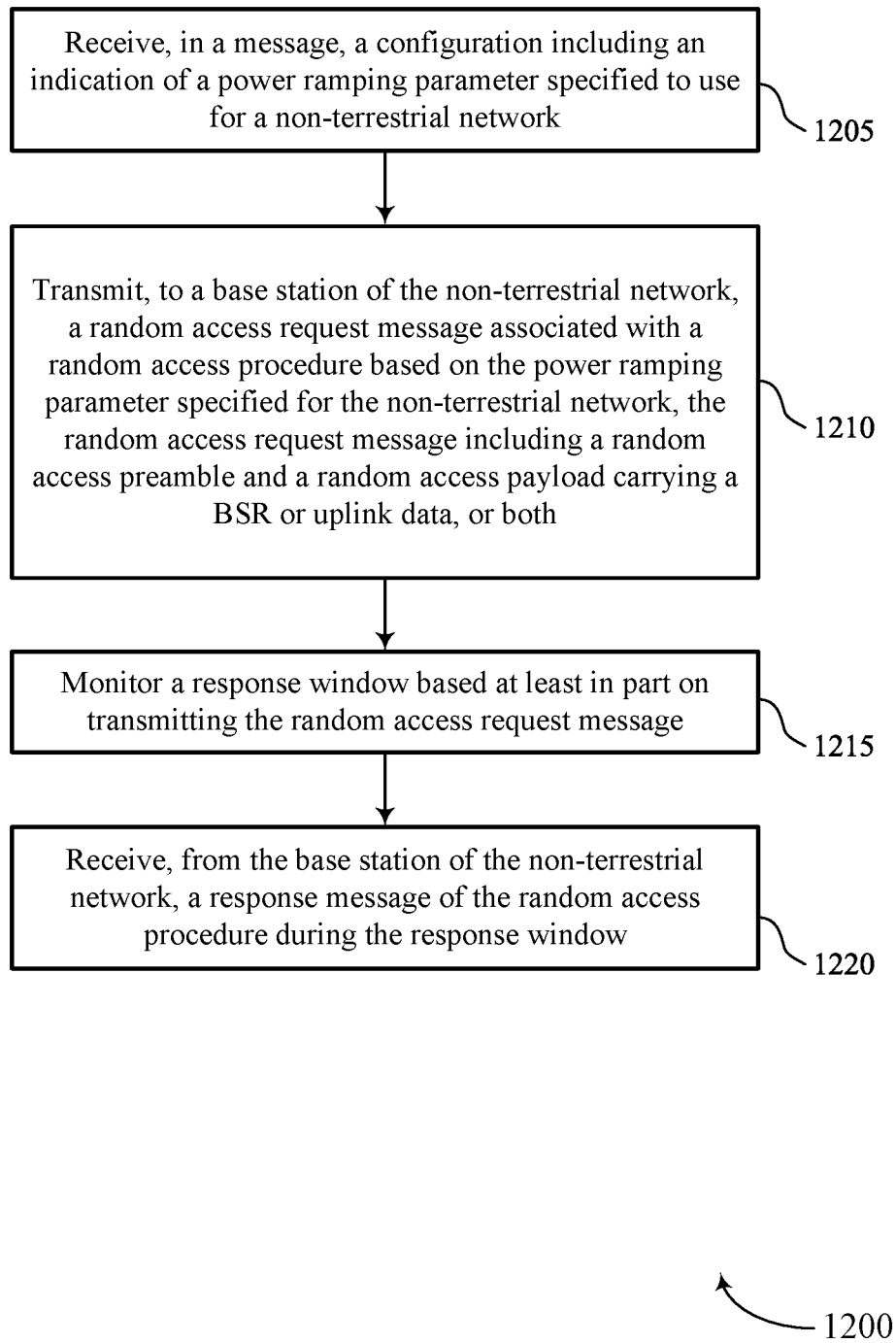

FIG. 12 shows a flowchart illustrating a method 1200 that supports random access procedures for non-terrestrial networks in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, in a message, a configuration including an indication of a power ramping parameter specified to use for a non-terrestrial network. The operations of 1205 may be performed in accordance with examples as disclosed herein. In some examples, aspects of the operations of 1205 may be performed by a power component 840 as described with reference to FIG. 8.

At 1210, the method may include transmitting, to a base station of the non-terrestrial network, a random access request message associated with a random access procedure based on the power ramping parameter specified for the non-terrestrial network, the random access request message including a random access preamble and a random access payload carrying a BSR or uplink data, or both. The operations of 1210 may be performed in accordance with examples as disclosed herein. In some examples, aspects of the operations of 1210 may be performed by a message component 825 as described with reference to FIG. 8.

At 1215, the method may include monitoring a response window based on transmitting the random access request message. The operations of 1215 may be performed in accordance with examples as disclosed herein. In some examples, aspects of the operations of 1215 may be performed by a window component 830 as described with reference to FIG. 8.

At 1220, the method may include receiving, from the base station of the non-terrestrial network, a response message of the random access procedure during the response window. The operations of 1220 may be performed in accordance with examples as disclosed herein. In some examples, aspects of the operations of 1220 may be performed by a message component 825 as described with reference to FIG. 8.

Figure 13:
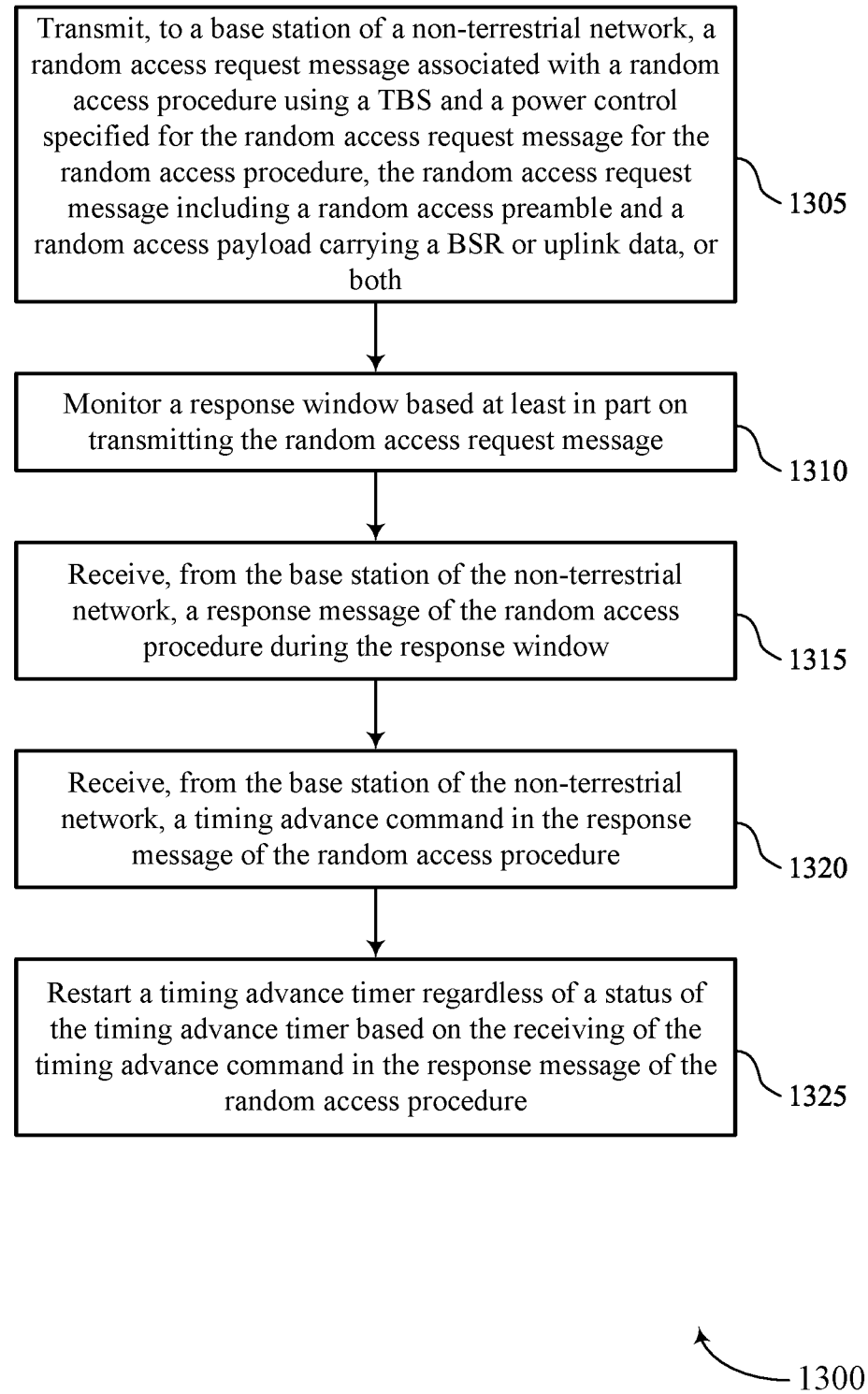

FIG. 13 shows a flowchart illustrating a method 1300 that supports random access procedures for non-terrestrial networks in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station of a non-terrestrial network, a random access request message associated with a random access procedure using a TBS and a power control specified for the random access request message for the random access procedure, the random access request message including a random access preamble and a random access payload carrying a BSR or uplink data, or both. The operations of 1305 may be performed in accordance with examples as disclosed herein. In some examples, aspects of the operations of 1305 may be performed by a message component 825 as described with reference to FIG. 8.

At 1310, the method may include monitoring a response window based on transmitting the random access request message. The operations of 1310 may be performed in accordance with examples as disclosed herein. In some examples, aspects of the operations of 1310 may be performed by a window component 830 as described with reference to FIG. 8.

At 1315, the method may include receiving, from the base station of the non-terrestrial network, a response message of the random access procedure during the response window. The operations of 1315 may be performed in accordance with examples as disclosed herein. In some examples, aspects of the operations of 1315 may be performed by a message component 825 as described with reference to FIG. 8.

At 1320, the method may include receiving, from the base station of the non-terrestrial network, a timing advance command in the response message of the random access procedure. The operations of 1320 may be performed in accordance with examples as disclosed herein. In some examples, aspects of the operations of 1320 may be performed by a timing component 845 as described with reference to FIG. 8.

At 1325, the method may include restarting a timing advance timer regardless of a status of the timing advance timer based on the receiving of the timing advance command in the response message of the random access procedure. The operations of 1325 may be performed in accordance with examples as disclosed herein. In some examples, aspects of the operations of 1325 may be performed by a timing component 845 as described with reference to FIG. 8.

The following provides an overview of aspects of the present disclosure:

Aspect 1: A method for wireless communication at a UE, comprising: transmitting, to a base station of a non-terrestrial network, a random access request message associated with a random access procedure using a TBS and a power control specified for the random access request message for the random access procedure, the random access request message including a random access preamble and a random access payload carrying a BSR or uplink data, or both; monitoring a response window based at least in part on transmitting the random access request message; and receiving, from the base station of the non-terrestrial network, a response message of the random access procedure during the response window.

Aspect 2: The method of aspect 1, further comprising: receiving, in a message, a configuration including an indication of the TBS specified for the random access procedure, the message comprising a RRC message, a MAC-CE message, or a DCI message, wherein the transmitting of the random access request message comprises: transmitting the random access payload on a PUSCH based at least in part on the TBS specified for the random access payload carried in the random access request message for the random access procedure.

Aspect 3: The method of any of aspects 1 through 2, further comprising: determining a set of TBSs based at least in part on a configuration, wherein the set of TBSs comprises: a first subset of TBSs to use for the random access payload based at least in part on the random access payload carrying the BSR without the uplink data; and a second subset of TBSs to use for the random access payload based at least in part on the random access payload carrying the uplink data without the BSR.

Aspect 4: The method of aspect 3, further comprising: selecting the TBS from the set of TBSs based at least in part on the random access payload carrying the BSR without the uplink data or the random access payload carrying the BSR with the uplink data, wherein the transmitting of the random access request message comprises: transmitting the random access payload on a PUSCH based at least in part on the selecting of the TBS.

Aspect 5: The method of any of aspects 3 through 4, wherein the selecting of the TBS from the set of TBSs for the random access payload carrying the BSR without the uplink data is based at least in part on the uplink data satisfying a TBS threshold.

Aspect 6: The method of aspect 5, wherein the selecting of the TBS from the set of TBSs for the random access payload carrying the BSR without the uplink data is based at least in part on a PUSCH resource configured for the random access procedure failing to satisfy a LCP associated with a logical channel for the uplink data.

Aspect 7: The method of any of aspects 3 through 6, wherein the first subset of TBSs is configured for a first PUSCH occasion associated with the random access procedure and the second subset of TBSs is configured for a second PUSCH occasion associated with the random access procedure, the first PUSCH occasion is different than the second PUSCH occasion.

Aspect 8: The method of any of aspects 1 through 7, further comprising: determining the TBS for the random access payload carrying the BSR based at least in part on a preamble associated with the random access request message, wherein the transmitting of the random access request message comprises: transmitting the random access payload on a PUSCH, based at least in part on the determining of the TBS for the random access payload, during a first PUSCH occasion associated the random access procedure or a second PUSCH occasion associated the random access procedure, or both.

Aspect 9: The method of any of aspects 1 through 8, further comprising: determining the TBS for the random access payload carrying the BSR based at least in part on a partitioning of a set of PRACH resources or a grouping of a set of random access preambles including the random access preamble associated with the random access procedure, wherein the transmitting of the random access request message comprises: transmitting the random access payload on a PUSCH, based at least in part on the determining of the TBS for the random access payload, during a first PUSCH occasion associated the random access procedure or a second PUSCH occasion associated the random access procedure, or both.

Aspect 10: The method of any of aspects 1 through 9, further comprising: receiving, in a message, a configuration including an indication of a power ramping parameter specified to use for the non-terrestrial network, wherein the transmitting of the random access request message associated with the random access procedure is based at least in part on the power ramping parameter specified for the non-terrestrial network.

Aspect 11: The method of aspect 10, further comprising: adjusting a transmit power level based at least in part on the power ramping parameter and a reference signal configuration comprising a SSB or a CSI-RS, wherein the transmitting of the random access request message comprises: transmitting the random access preamble on a PRACH or the random access payload on a PUSCH, or both, based at least in part on the adjusting of the transmit power level.

Aspect 12: The method of any of aspects 10 through 11, further comprising: adjusting a transmit power level based at least in part on the power ramping parameter, a reference signal configuration, or a serving cell configuration, or a combination thereof, wherein the reference signal configuration is different for the random access preamble and a previous random access preamble transmission, and the serving cell configuration is the same for the random access preamble and the previous random access preamble transmission, wherein the transmitting of the random access request message comprises: transmitting the random access preamble on a PRACH or the random access payload on a PUSCH, or both, based at least in part on the adjusting of the transmit power level.

Aspect 13: The method of any of aspects 1 through 12, further comprising: receiving, from the base station of the non-terrestrial network, a timing advance command in the response message of the random access procedure; and restarting a timing advance timer regardless of a status of the timing advance timer based at least in part on the receiving of the timing advance command in the response message of the random access procedure.

Aspect 14: The method of aspect 13, further comprising: configuring whether the UE determines the status of the timing advance timer after receiving the timing advance command, wherein restarting the timing advance timer is based at least in part on the configuring.

Aspect 15: The method of any of aspects 1 through 14, wherein the TBS and the power control are specified for the random access payload of the random access request message for the random access procedure.

Aspect 16: The method of any of aspects 1 through 15, further comprising: transmitting feedback information associated with the random access response message, wherein the response message is received on a PDSCH addressed to a C-RNTI, and the feedback information comprises a HARQ-ACK or a HARQ-NACK.

Aspect 17: The method of aspect 16, further comprising: adjusting a duration of the response window based at least in part on an offset value and the feedback information comprising the HARQ-NACK; monitoring the response window based at least in part on the adjusting of the duration of the response window; and receiving a retransmission of the response message of the random access procedure during the response window.

Aspect 18: The method of aspect 17, further comprising: receiving, in a message, a configuration including an indication of a value of a set of values for the duration of the response window, wherein each value of the set of values for the duration of the response window correspond to a respective round-trip delay value associated with a communication link of the non-terrestrial network, wherein the adjusting of the duration of the response window is based at least in part on the configuration.

Aspect 19: The method of any of aspects 16 through 18, further comprising: restarting the response window based at least in part on the feedback information comprising the HARQ-NACK.

Aspect 20: The method of any of aspects 16 through 19, further comprising: enabling an offset timer to monitor for a retransmission of the response message based at least in part on the transmitting of the feedback information or the response window expiring, or both.

Aspect 21: The method of any of aspects 16 through 20, further comprising: determining that the random access procedure is successful based at least in part on the receiving of the response message; and monitoring a PDCCH addressed to the C-RNTI based at least in part on the determining that the random access procedure is successful.

Aspect 22: An apparatus for wireless communication at a UE, comprising a processor; memory coupled with the processor; instructions stored in the memory and operable, when executed by the processor, to cause the apparatus to perform a method of any of aspects 1 through 21.

Aspect 23: An apparatus for wireless communication at a UE, comprising at least one means for performing a method of any of aspects 1 through 21.

Aspect 24: A non-transitory computer-readable medium storing code for wireless communication at a UE, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, to a network entity, a random access request message associated with a random access procedure using a set of transport block sizes and a power control, the random access request message including a random access payload that comprises a buffer status report or uplink data, or both, wherein a first subset of transport block sizes of the set of transport block sizes is associated with a first size for a first portion of the random access payload and a second subset of transport block sizes of the set of transport block sizes is associated with a second size for a second portion of the random access payload;

monitoring a response window based at least in part on transmitting the random access request message; and receiving, from the network entity, a response message during the response window.

2. The method of claim 1, further comprising:

receiving, in a message, a configuration including an indication of the set of transport block sizes, the message comprising a radio resource control message, a medium access control-control element message, or a downlink control information message, wherein the transmitting of the random access request message comprises:

transmitting the random access payload on a physical uplink shared channel based at least in part on the set of transport block sizes.

3. The method of claim 1, further comprising:

determining the set of transport block sizes based at least in part on a configuration, wherein the set of transport block sizes comprises:

the first subset of transport block sizes to use for the random access payload based at least in part on the first portion of the random access payload that comprises the buffer status report without the uplink data; and the second subset of transport block sizes to use for the random access payload based at least in part on the second portion of the random access payload that comprises the uplink data without the buffer status report.

4. The method of claim 3, further comprising:

selecting a transport block size from the set of transport block sizes based at least in part on the random access payload that comprises the buffer status report without the uplink data or the random access payload that comprises the buffer status report with the uplink data, wherein the transmitting of the random access request message comprises:

transmitting the random access payload on a physical uplink shared channel based at least in part on the selecting of the transport block size.

5. The method of claim 4, wherein the selecting of the transport block size from the set of transport block sizes for the random access payload that comprises the buffer status report without the uplink data is based at least in part on the uplink data satisfying a transport block size threshold.

6. The method of claim 4, wherein the selecting of the transport block size from the set of transport block sizes for the random access payload that comprises the buffer status report without the uplink data is based at least in part on a physical uplink shared channel resource configured for the random access procedure failing to satisfy a logical channel prioritization associated with a logical channel for the uplink data.

7. The method of claim 1, wherein the first subset of transport block sizes is configured for a first physical uplink shared channel occasion associated with the random access procedure and the second subset of transport block sizes is configured for a second physical uplink shared channel occasion associated with the random access procedure, the first physical uplink shared channel occasion is different than the second physical uplink shared channel occasion.

8. The method of claim 1, further comprising:

determining the set of transport block sizes for the random access payload that comprises the buffer status report based at least in part on a random access preamble included in the random access request message, wherein the transmitting of the random access request message comprises:

transmitting the random access payload on a physical uplink shared channel, based at least in part on the determining of the set of transport block sizes for the random access payload, during a first physical uplink shared channel occasion associated with the random access procedure or a second physical uplink shared channel occasion associated the random access procedure, or both.

9. The method of claim 1, further comprising:

determining the set of transport block sizes for the random access payload that comprises the buffer status report based at least in part on a partitioning of a set of physical random access channel resources or a grouping of a set of random access preambles including a random access preamble of the random access request message associated with the random access procedure, wherein the transmitting of the random access request message comprises:

transmitting the random access payload on a physical uplink shared channel, based at least in part on the determining of the set of transport block sizes for the random access payload, during a first physical uplink shared channel occasion associated with the random access procedure or a second physical uplink shared channel occasion associated the random access procedure, or both.

10. The method of claim 1, further comprising:

receiving, in a message, a configuration including an indication of a power ramping parameter, wherein the transmitting of the random access request message associated with the random access procedure is based at least in part on the power ramping parameter.

11. The method of claim 10, further comprising:

adjusting a transmit power level based at least in part on at least one of the power ramping parameter a reference signal configuration associated with a synchronization signal block, or a reference signal configuration associated with a channel state information reference signal, wherein the transmitting of the random access request message comprises:

transmitting a random access preamble of the random access request message on a physical random access channel or the random access payload on a physical uplink shared channel, or both, based at least in part on the adjusting of the transmit power level.

12. The method of claim 10, further comprising:

adjusting a transmit power level based at least in part on the power ramping parameter, a reference signal configuration, or a serving cell configuration, or a combination thereof, wherein the reference signal configuration is different for a random access preamble of the random access request message and a previous random access preamble transmission, and the serving cell configuration is the same for the random access preamble and the previous random access preamble transmission, wherein the transmitting of the random access request message comprises:

transmitting the random access preamble on a physical random access channel or the random access payload on a physical uplink shared channel, or both, based at least in part on the adjusting of the transmit power level.

13. The method of claim 1, further comprising:
receiving, from the network, a timing advance command; and
restarting a timing advance timer regardless of a status of the timing advance timer based at least in part on the receiving of the timing advance command.

14. The method of claim 13, further comprising:
configuring the UE to determine the status of the timing advance timer after receiving the timing advance command, wherein restarting the timing advance timer is based at least in part on the configuring.

15. The method of claim 1, wherein the power control is specified by a configuration for a power ramping parameter, a reference signal configuration, a serving cell configuration, or a combination thereof.

16. The method of claim 1, further comprising:
transmitting feedback information associated with the response message,
wherein the response message is received on a physical downlink shared channel addressed to a cell-radio network temporary identifier, and the feedback information comprises a hybrid automatic repeat request acknowledgement or a hybrid automatic repeat request non-acknowledgement.

17. The method of claim 16, further comprising:
adjusting a duration of the response window based at least in part on an offset value and the feedback information comprising the hybrid automatic repeat request non-acknowledgement;
monitoring the response window based at least in part on the adjusting of the duration of the response window; and
receiving a retransmission of the response message during the response window.

18. The method of claim 17, further comprising:
receiving, in a message, a configuration including an indication of a value of a set of values for the duration of the response window, wherein each value of the set of values for the duration of the response window corresponds to a respective round-trip delay value associated with a communication link,
wherein the adjusting of the duration of the response window is based at least in part on the configuration.

19. The method of claim 16, further comprising:
restarting the response window based at least in part on the feedback information comprising the hybrid automatic repeat request non-acknowledgement.

20. The method of claim 16, further comprising:
enabling an offset timer to monitor for a retransmission of the response message based at least in part on the transmitting of the feedback information or the response window expiring, or both.

21. The method of claim 16, further comprising:
determining that the random access procedure is successful based at least in part on the receiving of the response message; and
monitoring a physical downlink control channel addressed to the cell-radio network temporary identifier based at least in part on the determining that the random access procedure is successful.

22. A user equipment (UE), comprising:
a processor;
a transceiver;
memory coupled with the processor; and
instructions stored in the memory and operable, when executed by the processor, to cause the UE to:
transmit, via the transceiver to a network entity, a random access request message associated with a random access procedure using a set of transport block sizes and a power control, the random access request message including a random access payload that comprises a buffer status report or uplink data, or both, wherein a first subset of transport block sizes of the set of transport block sizes is associated with a first size for a first portion of the random access payload and a second subset of transport block sizes of the set of transport block sizes is associated with a second size for a second portion of the random access payload;
monitor, via the processor, a response window based at least in part on transmitting the random access request message; and
receive, via the transceiver from the network entity, a response message during the response window.

23. The UE of claim 22, wherein the instructions are further executable by the processor to cause the UE to:
receive, via the transceiver in a message, a configuration including an indication of the set of transport block sizes, the message comprising a radio resource control message, a medium access control-control element message, or a downlink control information message, wherein the instructions for transmitting of the random access request message are further executable by the processor to cause the UE to:
transmit, via the transceiver, the random access payload on a physical uplink shared channel based at least in part on the set of transport block sizes.

24. The UE of claim 22, wherein the instructions are further executable by the processor to cause the UE apparatus to:
determine, via the processor, the set of transport block sizes based at least in part on a configuration, wherein the set of transport block sizes comprises:
the first subset of transport block sizes to use for the random access payload based at least in part on the first portion of the random access payload that comprises the buffer status report without the uplink data; and
the second subset of transport block sizes to use for the random access payload based at least in part on the second portion of the random access payload that comprises the uplink data without the buffer status report.

25. The UE of claim 24, wherein the instructions are further executable by the processor to cause the UE to:
select, via the processor, a transport block size from the set of transport block sizes based at least in part on the random access payload that comprises the buffer status report without the uplink data or the random access payload that comprises the buffer status report with the uplink data, wherein the instructions for transmitting of the random access request message are further executable by the processor to cause the UE to:
transmit, via the transceiver, the random access payload on a physical uplink shared channel based at least in part on the selecting of the transport block size.

26. The UE of claim 25, wherein the selecting of the transport block size from the set of transport block sizes for the random access payload that comprises the buffer status report without the uplink data is based at least in part on the uplink data satisfying a transport block size threshold.

27. The UE of claim 25, wherein the selecting of the transport block size from the set of transport block sizes for the random access payload that comprises the buffer status report without the uplink data is based at least in part on a physical uplink shared channel resource configured for the random access procedure failing to satisfy a logical channel prioritization associated with a logical channel for the uplink data.

28. The UE of claim 22, wherein the first subset of transport block sizes is configured for a first physical uplink shared channel occasion associated with the random access procedure and the second subset of transport block sizes is configured for a second physical uplink shared channel occasion associated with the random access procedure, the first physical uplink shared channel occasion is different than the second physical uplink shared channel occasion.

29. An apparatus for wireless communication at a user equipment (UE), comprising:
  means for transmitting, to a network entity, a random access request message associated with a random access procedure using a set of transport block sizes and a power control, the random access request message including a random access payload that comprises a buffer status report or uplink data, or both, wherein a first subset of transport block sizes of the set of transport block sizes is associated with a first size for a first portion of the random access payload and a second subset of transport block sizes of the set of transport block sizes is associated with a second size for a second portion of the random access payload;
  means for monitoring a response window based at least in part on transmitting the random access request message; and
  means for receiving, from the network entity, a response message during the response window.

30. A non-transitory computer-readable medium storing code for wireless communication at a user equipment (UE), the code comprising instructions executable by a processor to:
  transmit, to a network entity, a random access request message associated with a random access procedure using a set of transport block sizes and a power control, the random access request message including and a random access payload that comprises a buffer status report or uplink data, or both, wherein a first subset of transport block sizes of the set of transport block sizes is associated with a first size for a first portion of the random access payload and a second subset of transport block sizes of the set of transport block sizes is associated with a second size for a second portion of the random access payload;
  monitor a response window based at least in part on transmitting the random access request message; and
  receive, from the network entity, a response message during the response window.

* * * * *